(12) United States Patent
Cowan

(10) Patent No.: US 6,707,518 B1
(45) Date of Patent: Mar. 16, 2004

(54) ELECTRO-OPTIC DEVICE ALLOWING WAVELENGTH TUNING

(75) Inventor: James J. Cowan, Lexington, MA (US)

(73) Assignee: CoHo Holdings, LLC, Burlington, MA (US)

(*) Notice: Subject to any disclaimer, the term of this patent is extended or adjusted under 35 U.S.C. 154(b) by 95 days.

(21) Appl. No.: 09/615,011

(22) Filed: Jul. 12, 2000

Related U.S. Application Data

(60) Provisional application No. 60/143,284, filed on Jul. 12, 1999.

(51) Int. Cl.[7] .......................... G02F 1/1335; H01S 3/08
(52) U.S. Cl. ...................... 349/113; 349/107; 349/160; 349/198; 372/92; 372/99; 372/105
(58) Field of Search .......................... 349/17, 107, 113, 349/160, 198, 201; 372/92, 97, 98, 99, 102, 105; 359/260; 356/454

(56) References Cited

U.S. PATENT DOCUMENTS

| | | | |
|---|---|---|---|
| 4,251,137 A | 2/1981 | Knop et al. | 350/347 |
| 4,402,571 A | 9/1983 | Cowan et al. | 350/162.17 |
| 4,496,216 A | 1/1985 | Cowan | 350/162.17 |
| 4,729,640 A | 3/1988 | Sakata | 350/348 |
| 4,839,250 A | 6/1989 | Cowan | 430/1 |
| 4,874,213 A | 10/1989 | Cowan | 350/3.67 |
| 4,888,260 A | 12/1989 | Cowan | 430/1 |
| 5,142,385 A | 8/1992 | Anderson et al. | 369/10 |
| 5,148,302 A | 9/1992 | Nagano et al. | 359/95 |
| 5,299,289 A | 3/1994 | Omae et al. | 359/95 |
| 5,334,342 A | 8/1994 | Harker et al. | 264/50 |
| 5,835,517 A | 11/1998 | Jayaraman et al. | 372/58 |
| 5,894,535 A | 4/1999 | Lemoff et al. | 385/47 |
| 5,956,112 A * | 9/1999 | Fujimori et al. | 349/156 |
| 5,978,062 A | 11/1999 | Liang et al. | 349/155 |
| 6,031,948 A | 2/2000 | Chen | 385/24 |
| 6,040,936 A * | 3/2000 | Kim et al. | 359/245 |
| 6,043,910 A * | 3/2000 | Slinger | 359/3 |
| 6,118,586 A | 9/2000 | Tanabe et al. | 359/566 |

FOREIGN PATENT DOCUMENTS

EP    0 498 375 A1    8/1992

OTHER PUBLICATIONS

Mallinson, S. R., "Wavelength–selective filters for single–mode fiber WDM systems using Fabry–Perot interferometers," *Applied Optics*, 62(3): 430–436 (1987).

Mashev, L., and Popov, E., "Zero Order Anomally of dielectric Coated Gratings," *Optics Communications*, 55(6): 377–380 (1985).

Peng, S., and Morris, G. M., "Experimental demonstration of resonant anomalies in diffraction from two–differential gratings," *Optics Letters*, 21(8): 549–551 (1996).

Magnusson, R., and Wang, S. S., "New Principle for optical filters," *Appl. Phys. Lett.*, 61(9): 1022–1024 (1992).

Sneh, A., et al., "High–Speed Wavelength Tunable Liquid Crystal Filter," *IEEE Photonics Technology Letters*, 7(4): 379–381 (1995).

(List continued on next page.)

Primary Examiner—Robert H. Kim
Assistant Examiner—Andrew Schechter
(74) Attorney, Agent, or Firm—Mirick, O'Connell, DeMallie & Lougee, LLP; Brian M. Dingman, Esq.

(57) ABSTRACT

Surface textures embossed in a substrate such as plastic include surface depressions or cones having equally-spaced, reflective terraced steps to support coherent reflections of incident light. A desired color or bandwidth of coherent reflected light off the terraced steps is produced by adjusting the index of refraction of a material in communication with the terraced steps of the substrate. Preferably, the index of refraction of each zone of terraced steps is controlled based on an applied electric field. Accordingly, light reflected from a plurality of controlled zones can be used to produce an image for an observer.

43 Claims, 22 Drawing Sheets

OTHER PUBLICATIONS

Sneh, A., Johnson, K. M., "High–Speed Continuously Tunable Liquid Crystal Filter for WDM Networks," *Journal of Lightwave Technology*, 14(6): 1067–1080 (1996).

Zhuang, Z., and Patel J. S., "Optical Communications Over a Wide Temperature Range Using a Tunable Liquid–Crystal Filter," *IEEE Photonics Technology Letters*, 5(2): 257–259 (1993).

Patel, J.S., "Electrically tunable ferroelectric liquid–crystal Fabry–Perot filter," *Optics Letters*, 17(6): 456–458 (1992).

Patel, J.S., et al., "Frequency Tracking of Tunable Liquid-Crystal Wavelength Filter for WDM Transmission," *IEEE Transactions Photonics Technology Letters*, 3(12): 1094–1096 (1991).

Patel, J.S., and Lee, S., "Electrically tunable and polarization insensitive Fabry–Perot étalon with a liquid–crystal film," *Appl. Phys. Lett.*, 58(22): 2491–2493 (1991).

Patel, J.S., and Maeda, M. W., "Tunable Polarization Diversity Liquid–Crystal Wavelength Filter," *IEE Photonics Technology Letters*, 3(8): 739–740 (1991).

Patel, J.S., et al., "Electrically tunable optical filter for infrared wavelength using Liquid crystals in a Fabry–Perot étalon," *Appl. Phys. Lett.*, 57(17): 1718–1720 (1990).

Maeda, M.W., et al., "Electronically Tunable Liquid–Crystal–Etalon Filter for High–Density WDM Systems," *IEEE Photonics Technology Letters*, 2(11): 820–822 (1990).

Patel, J.S., Maeda, M. W., "Multiwavelength Tunable Liquid–Crystal Etalon Filter," *IEEE Photonics Technology Letters*, 3(7): 643–644 (1991).

Hirabayashi, K., et al., "Polarization–Independent Tunable Wavelength–Selective Filter Using a Liquid Crystal," *IEEE Transactions Photonics Technology Letters*, 3(12): 1091–1093 (1991).

Hirabayashi, K., et al., "Narrow–Band Tunable Wavelength-Selective Filters of Fabry–Perot Interoferometers with a Liquid Crystal Intracavity," *IEEE Photonics Technology Letters*, 3(3): 213–215 (1991).

Sadot, D., and Boimovich, E., "Tunable Optical Filters for Dense WDM Networks," *IEEE Communications Magazine*, pp. 50–55 (Dec. 1998,).

Peng, S., and Morris, G.M., "Resonant scattering from two–dimensional gratings," *J. Opt. Soc. Am. A*, 13(5): 993–1005 (1996).

Raguin, D.H., and Morris, G.M., "Antireflectron structured surfaces for the infrared spectral region," *Applied Optics*, 32(7): 1154–1167 (1993).

Turkatte, C., and Albert, R., "Liquid–crystal devices promise high performance," *WDM Solutions*, (Feb., 2000).

Patel, J.S., and Silberberg, Y., "Liquid Crystal and Grating-Based Multiple–Wavelength Cross–Connect Switch," *IEEE Photonics Technology Letters*, 7(5): 514–516 (1995).

J. W. Goodman, "Holography." In "Introduction to Fourier Optics," (SF:McGraw–Hill), pp. 295–392 (1968).

Alan Chen, et. al., "Enhanced, reflective, liquid–crystal displays using DuPont holographic recording films," SPIE's International Technical Group Newsletter, Jan. 1999.

J. William Doane, "Reflective Cholesteric Liquid–Crystal Displays," Information Display, Dec. 1996.

Carl O. Bozler, et. al., "Arrays of gated field–emitter cones having 0.32 um tip–to–tip spacing," J. Vac. Sci. Technol, B 12(2) pp. 629–632 Mar./Apr. 1994.

James J. Cowan, "Holographic Honeycomb Microlens," Optical Engineering, 24(5), 796–802 Sep./Oct. 1985.

James J. Cowan, "Aztec surface–relief volume diffractive structure," Journal of the Optical Society of America A, vol. 7, No. 8, , pp. 1529–1544, Nov. 1990.

G. P. Bryan–Brown, "Grating Aligned Bistable Nematic Device," SID 97 Digest, pp. 37–40.

J. Thomas Brownrigg, "Design and Performance of a Miniature Dual–Beam Diode–Array Spectrometer," American Holographic, Inc., Designed by Worldwide WebLabs.

Dan Sadot, et. al., "Tunable Optical Filters for Dense WDM Networks," IEEE Communications Magazine, pp. 50–55 Dec. 1998.

J.S. Patel, et. al., Electrically tunable and polarization insensitive Fabry–Perot etalon witha liquid–crystal film, 1991 American Institute of Physics, Appl. Phys. Lett 58 (22), pp. 2491–2493, Jun. 3, 1991.

James J. Cowan, "Electrically Tunable Color Filters for Displays," AZTEC Systems, Inc., Sep. 15, 2000.

James J. Cowan, "Tunable Optical Filters for Telecommunications," AZTEC Systems, Inc., Sep. 15, 2000.

Dan Sadot, et. al., "Tunable Optical Filters for Dense WDM Networks," pp. 50–55, AZTEC Systems, Inc., Dec. 1998.

James J. Cowan, et al., "Progress in Holographic Applications," pp. 49–56, A Reprint from the Proceedings, Cannes, France Dec. 5–6, 1985.

James J. Cowan, et. al., "The Recording and Replication of Holographic Micropatterns for the Ordering of Photographic Emulsion Grains in Film Systems," Journal of Imaging Science, vol. 31, No. 3, pp. 101–107, May/Jun. 1987.

Alan G. Chen, et. al., "Holographically Reflective Liquid Crystal Display," Society for Information Display International Symposium, Orlando, May 23, 1995.

M. Wenyon, et al., "White holographic reflectors for LCDs" Sociey for Information Display 1997 International Symposium, Hynes Convention Center, Boston, MA, May 14, 1997.

T. J. Trout, et al., "Photopolymer Materials for Color Holography," Preprint, SPIE Jun. 1995, Tokyo, Japan.

Meher Antia, "Switchable Reflections Make Electronic Ink," vol. 285 Science, pp. 685, Jul. 30, 1999.

"The MicroDisplay Corporation," website, www.microdisplay.com/main.html.

Yoichi Taira, "Reflective Color Liquid–Crystal Displays," pp. 26–29, AZTEC Systems, Inc., 2000 according to document.

Adam K. Fontecchio, et.al., "P–60: Spatially Pixelated Reflective Arrays from Holographic–Polymer Dispersed Liquid Crystals", pp. 1–4, SID 00 Digest.

"Optical Fiber Gratings," Optical Fiber Conference 2000:SC121.

* cited by examiner

ELECTRO-OPTIC DEVICE ALLOWING WAVELENGTH TUNING

RELATED APPLICATION

This application claims the benefit of U.S. Provisional Application No. 60/143,284 entitled "Electro-Optic Device for Continuous Wavelength Tuning," filed Jul. 12, 1999, the entire teachings of which are incorporated herein by reference.

BACKGROUND OF THE INVENTION

One aspect of the present invention is directed towards an electro-optic device allowing continuous wavelength tuning.

Current efforts to replace paper include the utilization of new materials such as electronic ink. Based on this technology, electrically switched dyes bound in microscopic containers are suspended in a solvent. When switched, colored dyes physically move to the top surface of the microscopic containers where they are used to reflect part of the visible spectrum back to an observer's eye; a plurality of microscopic containers collectively create an image. Multiple dyes are used to cover the visible spectrum, however, light utilization is typically poor. The creation of images using these reflective/absorptive dyes, therefore, still needs considerable development.

Another technique for creating displays involves the use of electrically-variable stratified mediums to create a dynamic version of the imaging technique developed by Lippmann at the end of the last century. Basically, color is extracted when light is partially transmitted and reflected from multiple layers in a stratified medium, where the spacing of the layers dictates which color resonates. This interference phenomenon can be quite efficient. However, there is a need to develop materials and processes such that the spacing of the layers within the material volume can be varied electronically. Unfortunately, the piezoelectric materials under investigation require high voltages (large power) and have no long term persistence, i.e., they relax to their static state when power is removed. Moreover, a complex manufacturing process is required to produce the multiple layers composed of uncommon materials which typically results in poor yields and high cost.

Another technology for producing electronic paper type displays currently under development involves the use of reflective liquid crystal displays (LCDs). Here, the application is leveraged off the huge flat-panel display industry. One group of investigators has demonstrated time-stable, virtually zero-power consumption LCDs that are produced using standard nematic phase liquid crystals aligned with an underlying surface structure. When the liquid crystal molecules align to the surface structure, they produce domains within a liquid cell that are mechanically robust. Thus, mild vibrations and other physical shocks typically do not disturb the alignment. Optical effects of the surface structure (typically just an asymmetric profile grating) are not exploited, and are in fact suppressed due to their typically broad spectrum dispersive nature.

A second group of investigators has begun exploiting the optical effects of a surface structure grating to direct a portion of the broad spectrum reflected from the grating through a pixel window in an LCD. Each pixel consists of red, green, and blue sub-pixels, wherein the sub-pixels include a grating with a pitch such that the diffraction angle of the dispersed light matches the acceptance angle of the pixel window. Liquid crystal is used as a shutter over each window or pixel to block light.

Another class of researchers works with polymer dispersed liquid crystals, where a volume holographic medium such as a photo-polymer is infused with liquid crystal material. The liquid crystal collects in pockets within the photo-polymer and has no particular alignment when an electric field is not present. A volume hologram is then recorded within the medium using a diffusing screen as the object in a manner similar to that used in the manufacture of high-efficiency, non-specular reflecting diffusers. Most of the liquid crystal pockets migrate to areas where the recording intensity is weak, further accentuating the resulting stratification comprising the volume hologram. When a high-voltage is applied across the medium, the liquid crystals in the pockets align with the electric field, and the light reflected from the hologram is then predominantly scattered by the liquid crystal pockets. The result is a device that can be switched between a high brightness single color reflection and a milky white reflection. Stacking three such devices with red, green, and blue reflections yields a full color display. Unfortunately, the design requires a high voltage operation and includes having to write three separate volume holograms in production.

Lastly, researchers at Kent Displays (Kent State University) have begun to exploit the benefits of recently discovered properties of cholesteric liquid crystals. Apparently, they have been able to fabricate liquid crystal cells where the liquid crystal molecules can be made to organize and align in planes parallel to the cell walls. This creates a stratified medium with layers spaced in the 200 to 300 nm range depending on the liquid crystal composition. These layers will reflect visible light in the 400 to 600 nm range in exactly the same manner as that described by Lippmann. When voltage is applied across the cell, the planar structure is destroyed as all the molecules align parallel with the electric field. The liquid crystal is then optically transparent, reflecting the natural color of the cell substrate. As with the polymer dispersed LCD efforts, full color is attained by stacking three liquid crystal cells reflecting either red, green, or blue.

SUMMARY OF THE INVENTION

It is an advancement in the art to provide an electro-optic device capable of continuous wavelength tuning of reflected or transmitted incident electromagnetic waves.

According to the principles of the present invention, an electro-optical device comprises a substrate having successive reflective steps spaced from an electrode, where the steps reflect incident electromagnetic waves such as broadband light. A voltage applied to an electrode disposed adjacent to the substrate adjusts the wavelength of the electromagnetic waves in the space between the substrate and the electrode. Accordingly, the voltage applied to an electrode such as a transparent conductive strip adjusts a wavelength or band of wavelengths that is reflected to an observer.

In one application, the space between the electrode and substrate includes a material having a variable index of refraction that is adjusted based on an applied voltage. Such a material filling this space can be, for example, a liquid crystal. Preferably, the material is disposed so that it is in communication with the reflective steps of the substrate.

Based on these principles, an image can be produced for an observer by adjusting light reflected from multiple reflective steps of the substrate. To enhance a viewing field of reflected wavelengths of light for an observer, the reflective steps can be angled with respect to a planar axis of the substrate to reduce potential glare.

Another embodiment according to the principles of the present invention is directed to an apparatus and method for tuning which of multiple incident electromagnetic waves pass through an electro-optic device. The electro-optic device comprises a first transparent substrate having terraced steps on a face. A second transparent substrate also having terraced steps is disposed to face the terraced steps of the first substrate. A material, such as liquid crystal, having a variable index of refraction is provided between the first and second substrate to adjust wavelengths of passing light. Based on a tuned index of refraction of the material disposed between the first and second substrate, certain wavelengths pass through material and both substrates of the electro-optic device. Wavelengths of light corresponding to a spacing of terraced steps of the first and second substrate become resonant between the first and second substrate and are reflected out an end of the electro-optic device into which the wavelength of light was originally directed.

The electro-optic devices according to the principles of the present invention are advantageous because wavelengths of light can be selected dynamically based on a controlling input. Other optical devices such as thin film filters are limited to a preselected wavelength as set at a factory.

Based on the principles of the present invention, it is possible to manufacture flexible, inexpensive substrates that can be used in display applications. Such displays require little or no power to maintain a displayed image, make efficient use of ambient room light for enhanced viewing by an observer, and can be produced as flexible substrates so that a display can bend without being damaged. Additionally, the displays can be manufactured lightweight and thin for space-sensitive applications.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

One aspect of the present invention is generally directed towards an electro-optical device for controlling the wavelength and, therefore, color of reflected light off a surface texture. By controlling reflected light in a plurality of pixel regions, a multi-colored image can be produced for an observer.

Figure 1:
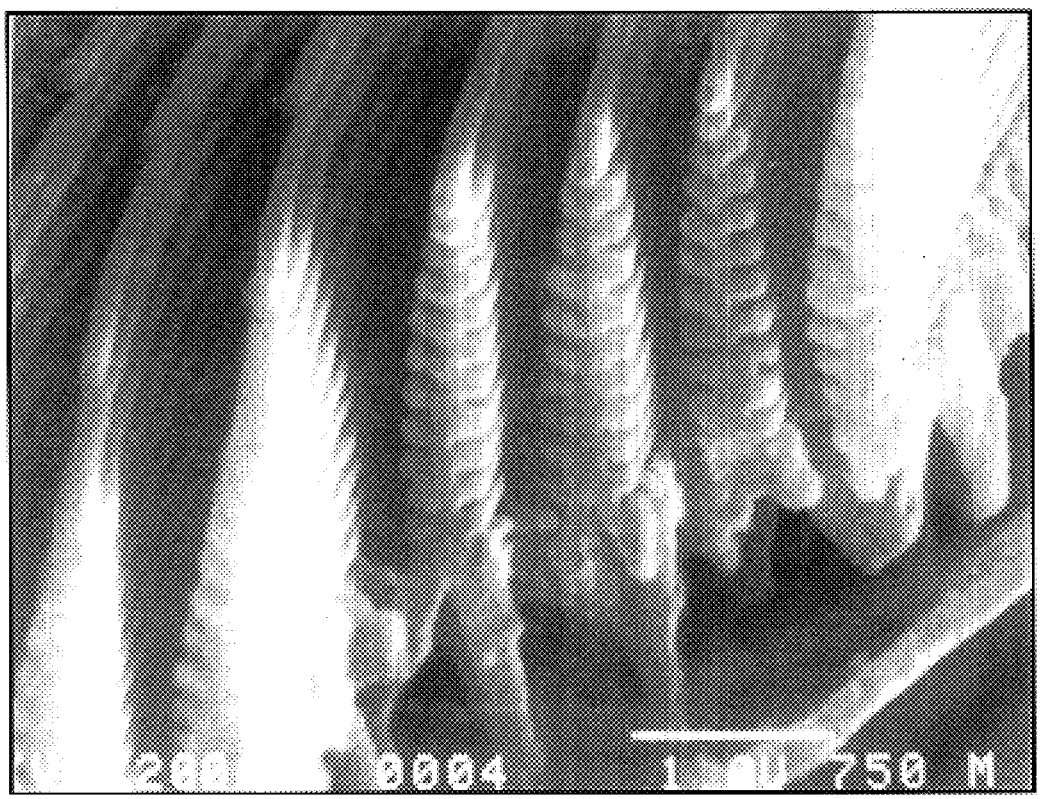
FIG. 1 is an electron micrograph scan of a MORPHO Butterfly wing.

FIG. 1 is an electron micrograph scan of a South American butterfly that produces brilliant iridescent colors even though there is no color pigment present in its wing. The brilliant color of the wing results from ribbed gratings that resemble a linear grating when viewed from above. An analysis of this wing reveals that the wing acts similar to a volume multilayer stack composed of quarter wavelength thicknesses of two different media. Incident light reflecting off of the surface of the wing adds coherently to produce a brilliant blue color of light for an observer's eye.

Figure 2:
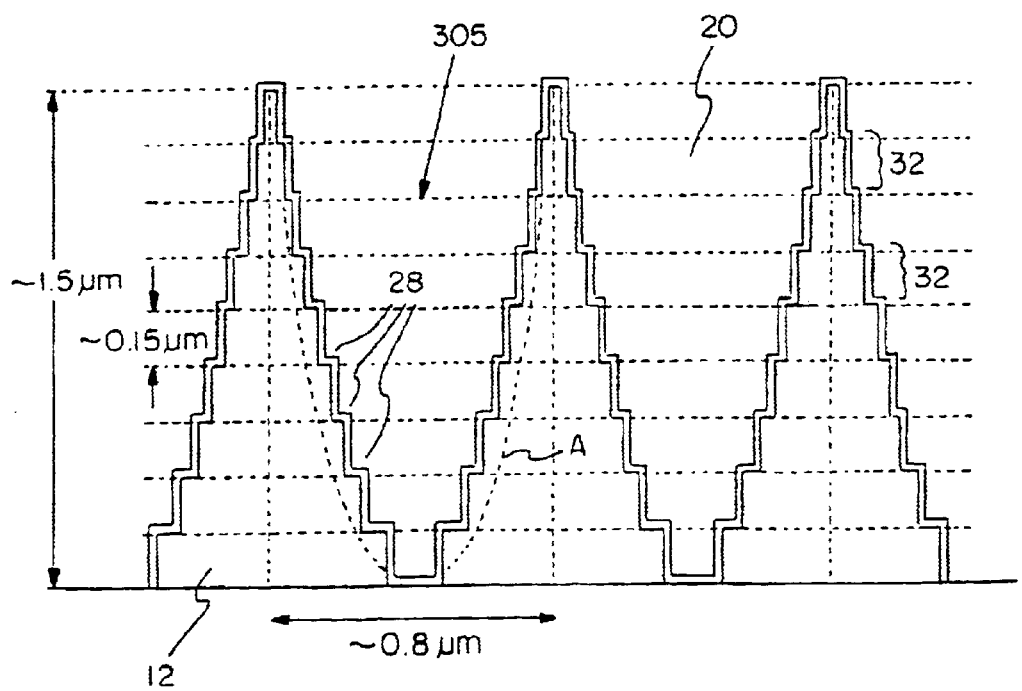
FIG. 2 is a side-view diagram of a reflective surface texture for supporting coherent reflections of light energy.

FIG. 2 is a side view of a digitized surface texture having a high efficiency reflection surface otherwise known as an Aztec surface texture based in part on the principles of FIG. 1. A plurality of fine terraced steps 28 or gratings at equal spacings 32 are superimposed onto a coarse circular grating as viewed from above in FIG. 3. In one embodiment, the terraced steps 28 form a parabolic-shaped cross-section as shown by line A in FIG. 2.

A coating 14 of highly reflective material is provided on the surface of each terraced step 28. When broadband light reflects off the surface of the terraced surface texture or substrate 12, the light is reflected off the equally spaced terraced steps 28 at a wavelength given by twice the step spacing 32 times the index of refraction of the surrounding medium 20. The light reflecting off multiple terraced steps 28 adds coherently to produce light of a certain bandwidth as found in the aforementioned butterfly wing. The following references: U.S. Pat. No. 4,888,260, U.S. Pat. No. 4,874,213, U.S. Pat. No. 4,839,250, U.S. Pat. No. 4,496,216 all issued to Cowan, describe methods and devices related to the present application; the entire teaching of all of these patents are incorporated herein by reference. These patents describe the formation of the Aztec surface texture using laser interferometry.

Figure 3:
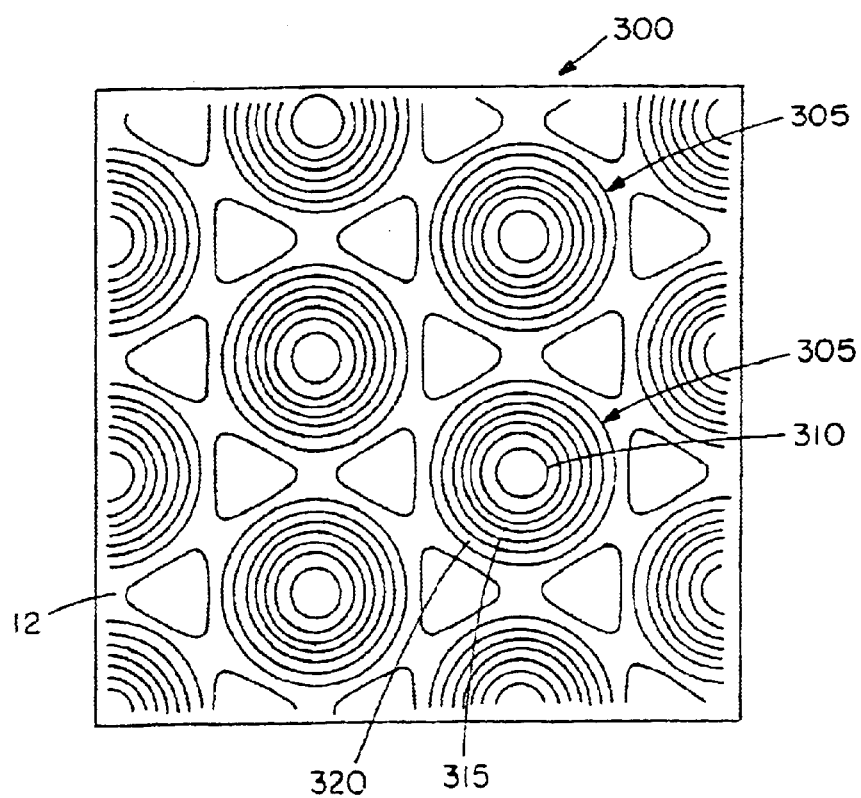
FIG. 3 is a top-view diagram of a reflective surface texture for supporting coherent reflections of light energy.

FIG. 3, as mentioned, is a top view of depressions 305 or cones formed in substrate 12 such as plastic. Based on a positioning of stepped depressions 305 as shown, a honeycomb pattern 300 is produced. Each depressions 305 is formed by successively deeper steps 28 of preferably equal area. That is, the surface area as viewed from above of the deepest inner step 310 is preferably equal to surface area of middle step 315 and outer step 320.

It should be noted that honeycomb pattern 300 is optionally formed by stepped cones 305 that protrude out towards an observer. For example, outer step 320 as viewed from above in FIG. 3 is optionally farthest away from observer and steps are successively formed so that innner step 310 is closest to an observer.

Figure 4:
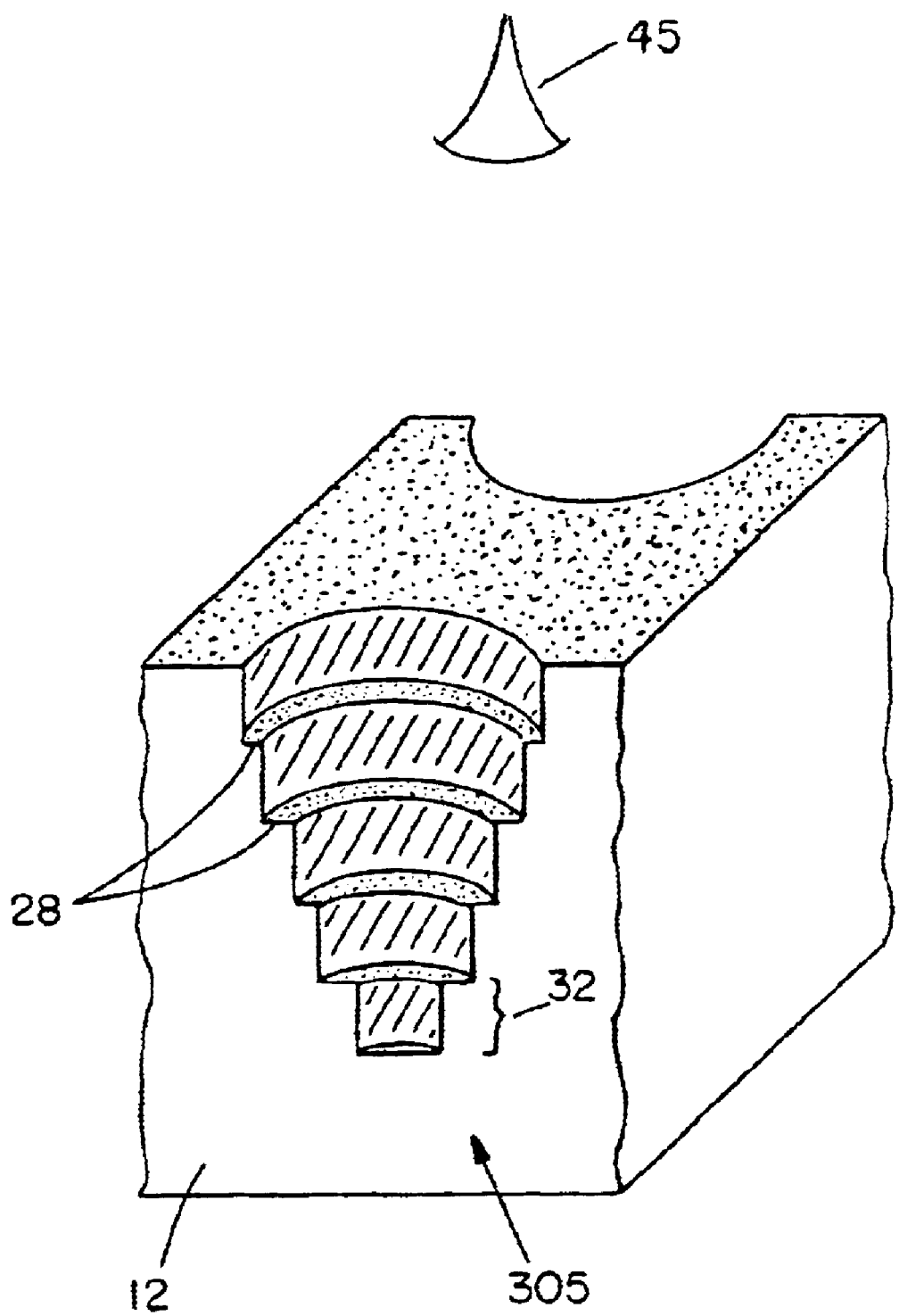
FIG. 4 is a cutaway view of a reflective surface texture for supporting coherent reflections of light energy.

FIG. 4 is a cutaway view of a depression 305 formed on the surface of substrate 12. As mentioned, reflective steps 28 are optionally shaped like cones protruding outward towards an observer.

Figure 5:
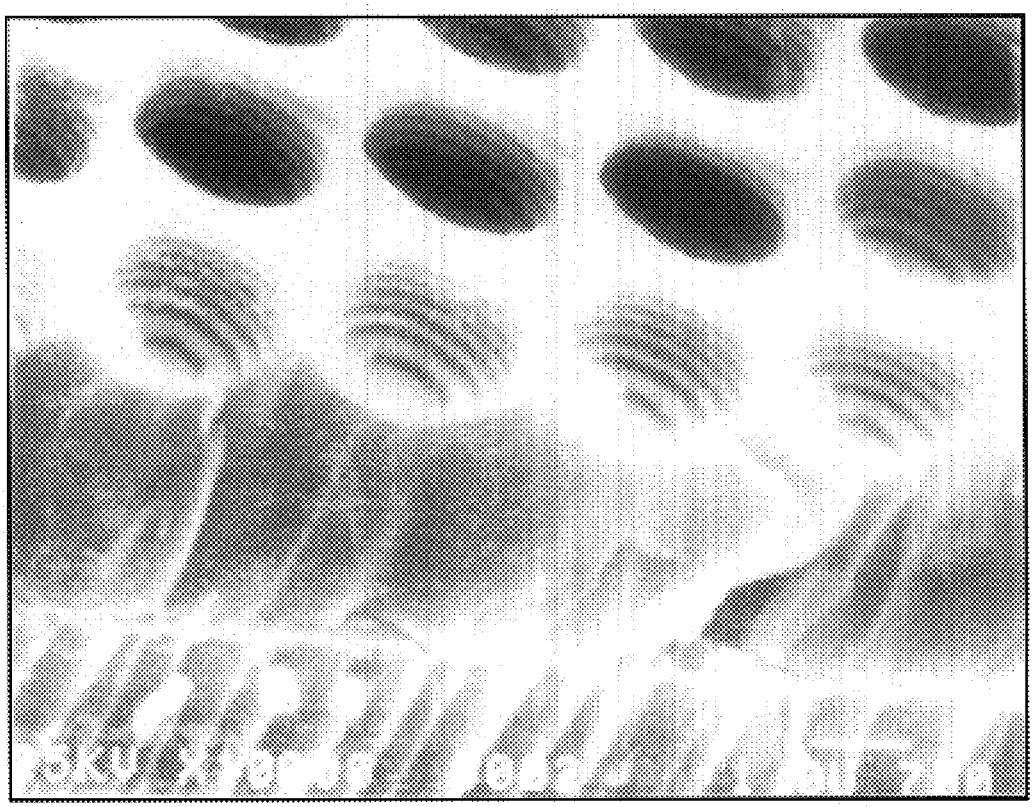
FIG. 5 is a photograph of a photo-resist material including reflective surface textures for supporting coherent reflections of light energy.

FIG. 5 is an actual photograph of the stepped, parabolic-shaped depressions 305 that form a honeycomb pattern 300 resulting from a technique using a photo-resist and laser technology. Generally a surface texture including depressions 305 is formed in a photresist material. From the photoresist material, a nickel master can be used to emboss or stamp plastic in a future process.

A nickel master is formed by coating the photoresist surface texture in FIG. 5 with silver and, thereafter, electroplating a layer of nickel over the silver. This layer of nickel is then separated from the photoresist to form a first generation nickel master. A second generation complementary nickel master, can then be electroplated from the first nickel master. In this way, a master is either a flat surface with honeycomb depressions 305 or, alternatively, a protruding honeycomb array of cones. Either master can be used to create impressions such as depressions 305 or cones in a material such as plastic to produce substrate 12.

The process of creating surface textures including cones or depressions 305 involves embossing or pressing the master directly into a substrate 12 such as a plastic sheet or surface that has been softened by heat or solvent. In one embodiment, a nickel master formed on the outer surface of a drum can be rolled to make an imprint in a soft resinous and light sensitive material that is hardened using UV light after an impression is formed. In some respects, the master creates impressions in the plastic as a tire leaves patterns in wet snow. Impressions of the nickel master in the plastic are substantially identical such that the pattern in the plastic complements that of the master. After embossing, a final step involves coating the surface of the plastic with a reflective material such as aluminum or silver. This is general procedure for generating substrate 12 such as embossed plastic as shown in FIGS. 2, 3, 4 and 5.

As shown in FIGS. 2 and 3, each groove or terraced step 28 in the sidewall of a depression 305 formed by stamping the nickel master into plastic effectively is a shelf or step 28 having preferably equal surface area. In one embodiment as previously mentioned, successive steps 28 such as inner step 310, middle step 315 and outer step 320 are substantially parallel. Both of these attributes help to more evenly distribute any reflected light among the different level of steps 28 or grooves to an observer 45. When the step or grooved surface is over-coated with reflective metal and illuminated with broadband incident light such as white light, the reflected color in the zero order will be characteristic of the step spacing 32 and an equal amount of light will be resonantly reflected from each successive equal surface area layer. In one embodiment, the surface texture is coated with aluminum having a zero order efficiency of 90% or, alternatively, silver having a 98% efficiency in the visible spectral region. It should be noted that other reflective materials can be used to achieve similar results as provided by an aluminum or silver coating.

Figure 6:
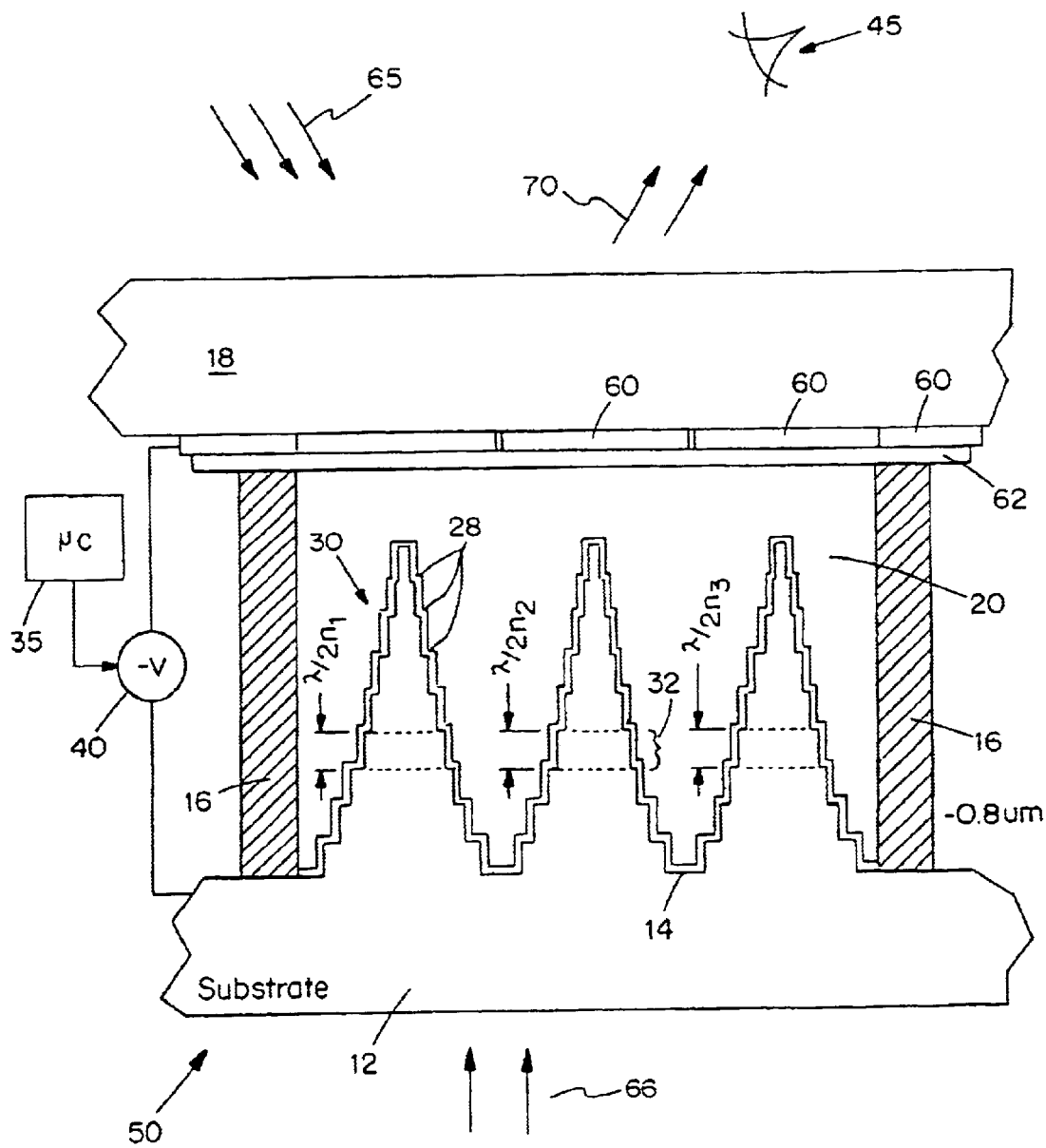
FIG. 6 is a diagram illustrating a cross-sectional view of an electro-optic device for wavelength tuning according to the principles of the present invention.

FIG. 6 shows an embodiment of the tuneable electro-optic device 50 according to the principles of the present invention. A reflective coating 14 of material such as metal or plastic is applied to the surface of substrate 12 such as embossed plastic. Reflective coating 14 is typically an evaporated metal deposit of material approximately 50 nanometers thick. Spacers 16 are formed of suitable insulating material such as glass and act to support transparent superstrate 18 directly over or adjacent to the reflective coating 14 on substrate 12. In one embodiment, substrate 12 is separated from superstrate 18 by approximately 20 micrometers.

Medium 20 between the reflective substrate 12 and the transparent superstrate 18 is preferably liquid crystal or a similar material having a variable index of refraction that can be controlled. In the embodiment as shown in FIG. 6, medium 20 such as a liquid crystal reacts to an applied voltage 40 across the reflective coating on substrate 12 and pixelated transparent conductive strips 60 on the underside of transparent superstrate 18. Based on this construction, the applied voltage 40 or electric field in medium 20 in each pixelated area, such as a depression 305 or multiple neighboring depressions 305, controls the index of refraction of medium 20. A desired wavelength of coherent reflected light 70 is tuned from incident light 65 by controlling the applied voltage 40 via micro-controller or microprocessor 35. An optical alignment layer 62, as is well known in certain LCD (Liquid Crystal Display) applications, is used to align the liquid crystals in medium 20.

In applications where medium 20 is a tuned liquid crystal and there is a greater separation between substrate 12 and superstrate 18, proportionally more time is needed to tune the liquid crystal to an appropriate index of refraction.

According to the principles of the present invention, incident light 65 comprised of broadband wavelengths, for example, in the range of 400 to 700 nanometers is directed towards the surface of transparent superstrate 18 as shown in FIG. 6. The incident light 65 penetrates to the liquid crystal medium 20 and reflects off the reflective surface of terraced steps 28. Wavelengths of reflected light 70 that correspond to the spacing 32 of each successive step 28 add constructively, creating high intensity reflected light 70 of predominantly one wavelength or narrow bandwidth. This reflected light 70 can be tuned for an observer 45 as electro-optic device 50 is optionally a display.

In one embodiment as shown in FIG. 6, there are nine terraced steps 28 for a stepped depression 305, where each step 28 has an approximate spacing 32 of 160 nanometers. As a result, the overall height of spacers 16 is at least 1.6 micrometers. However, height of spacers 16 is preferably several times the depth of a depression 305. It should be noted that the principles of the present invention are optionally achieved using a different spacing 32 or number of terraced steps 28. For example, a greater number of steps 28 in a depression 305 results in more narrow bands of reflected light 70.

In accordance with the present invention, the index of refraction of medium 20 directly above the substantially parallel terraced steps 28 is changed to control the color of light reflected 70 back to an observer 45. The wavelength of the incident light 65 transmitted into the liquid crystal medium 20 changes when it travels through medium 20. For example, the degree to which the wavelength of incident light 65 changes depends on the index of refraction of medium 20 that is traversed by incident light 65. As mentioned, the wavelength of coherent reflected light 70 that adds constructively is therefore controlled by the applied voltage, since the applied voltage is used to control the index of refraction of medium 20.

One aspect of the present invention is directed towards generating reflected light 70 in the visual spectrum. As mentioned, the number of terraced steps 28 for a particular depression or cone 305 can be varied to adjust the bandwidth of reflected light 70. It is recognized that the bandwidth of coherent light reflected off terraced steps 28 is inversely proportional to the number of steps in a depression or cone 305. For example, a depression 305 with five steps can generally produce reflected light 70 having a bandwidth of approximately 100 nm. A reflective texture including nine terraced steps 28 generally results in a more narrow bandwidth of reflected light 70 of roughly 50–60 nm. Accordingly, the number of steps 28 in a depression 305 or cone can be varied to produce more or less monochromatic reflected light 70.

Figure 7:
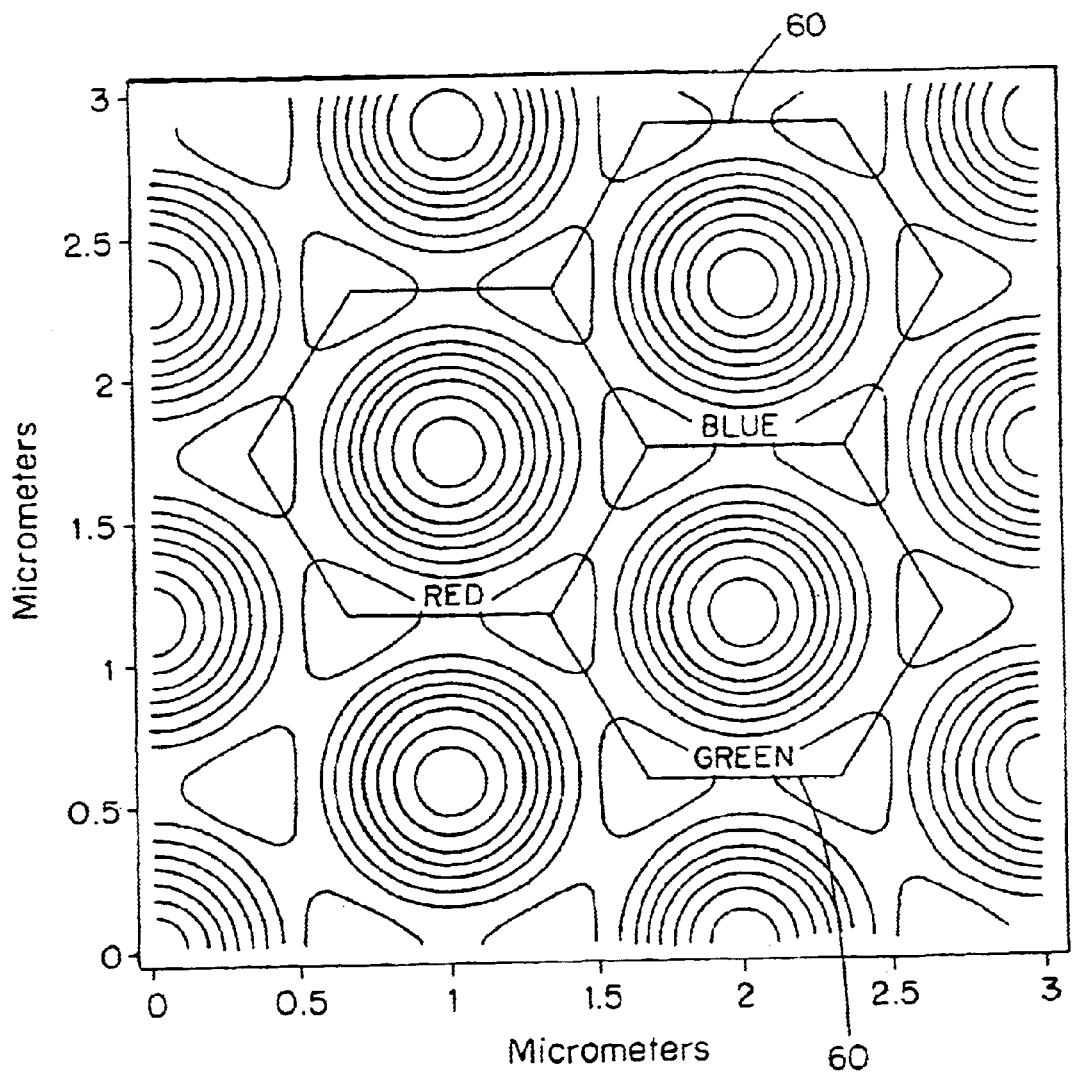
FIG. 7 shows a top view of separate pixel regions that support wavelength-tuning according to the principles of the present invention.

It is well known that any color can be produced by mixing appropriate quantities of primary colors red, green and blue. The present invention optionally achieves this by creating pixelated zones as shown in FIG. 7 of these three colors, similar to pixels on a display of a televison set. Transparent conductive strips 60 above each corresponding depression 305 or cone form colored pixel regions that are driven by a voltage source to create an electric field that adjusts the index of refraction of medium 20 to produce the desired color of reflected light 70. Based on a more densely packed area of conductive strips 60 creating pixel regions, a higher resolution picture can be produced for an observer 45. Unlike the glass viewing screen of a television set or computer display, the viewing region according to the principles of the present invention can be made highly flexible and flat.

It should be noted that the spacing 32 of the terraced steps 28 on each cone or depression 305 are optionally selected in one embodiment for optimizing a color pattern. For example, successive spacings 32 of substantially parallel terraces 28 in a cone or depression 305 for a red region is optionally different than the successive spacing of substantially parallel terraces 28 in a cone or depression 305 for a blue region. In this way, a group of three closely packed cones or depressions 305, corresponding to red, green and blue, can have terraced steps 28 of three different heights (not shown) optimized for an appropriate color in each region. This configuration is advantageous in applications where the index of refraction of medium 20 has a limited range of refractive indices. For example, some liquid crystal material has an index of refraction that varies by 0.2 or 0.3 based on a swing of applied voltage.

In a preferred embodiment, the spacing between each successive terraced step 28 is identical and the index of refraction of medium 20 changes sufficiently to support coherent reflections of a full range of visible light. Although FIG. 7 shows that each depression 305 is formed by a single pixel region, a pixel can be formed by enlarging a conductive strip 60 to include multiple neighboring depressions 305 of honeycomb pattern 300.

Based on the composite of materials in the present invention including plastic, metal and glass, the resulting surface texture can bend as though it were a piece of flexible paper, without causing damage to the electro-optical device 50. Consequently, the present invention is advantageous in applications where a viewing screen is exposed to harsh environments that would otherwise damage a viewing screen if it were inflexible.

It should also be noted that according to the principles of the present invention, light 66 is optionally shown through a transparent embossed substrate 12 of the device 50 to create the same visual effect to an observer 45. For example, light 66 such as broadband light shines through substrate 12 to produce coherent light for an observer 45.

"Moving" images can be formed by selectively energizing pixel regions similar in some respects to the way a picture is produced by a television set. As mentioned, a microprocessor 35 controls the voltage 40 applied across multiple pixel regions or conductive strips 60 to produce an image. A static image can be produced on a display according to the principles of the present invention by maintaining the voltage of each pixel for longer periods of time.

Figure 8A:
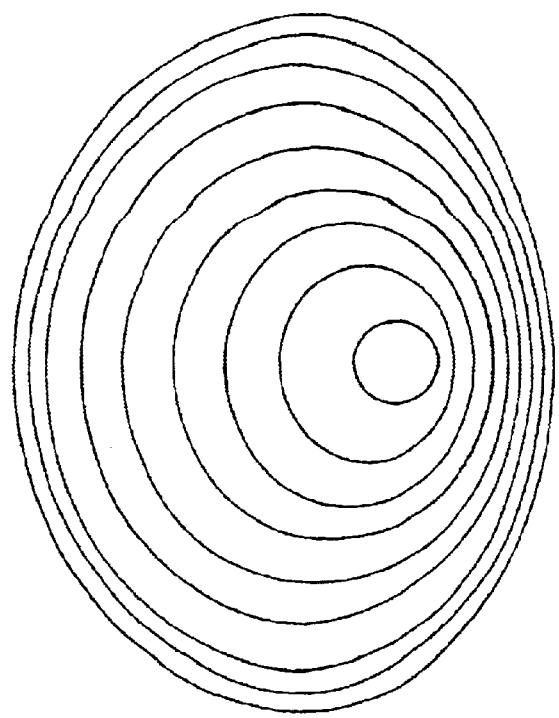
FIG. 8A is a top view of an asymmetrical reflective surface texture according to the principles of the present invention.
Figure 8B:
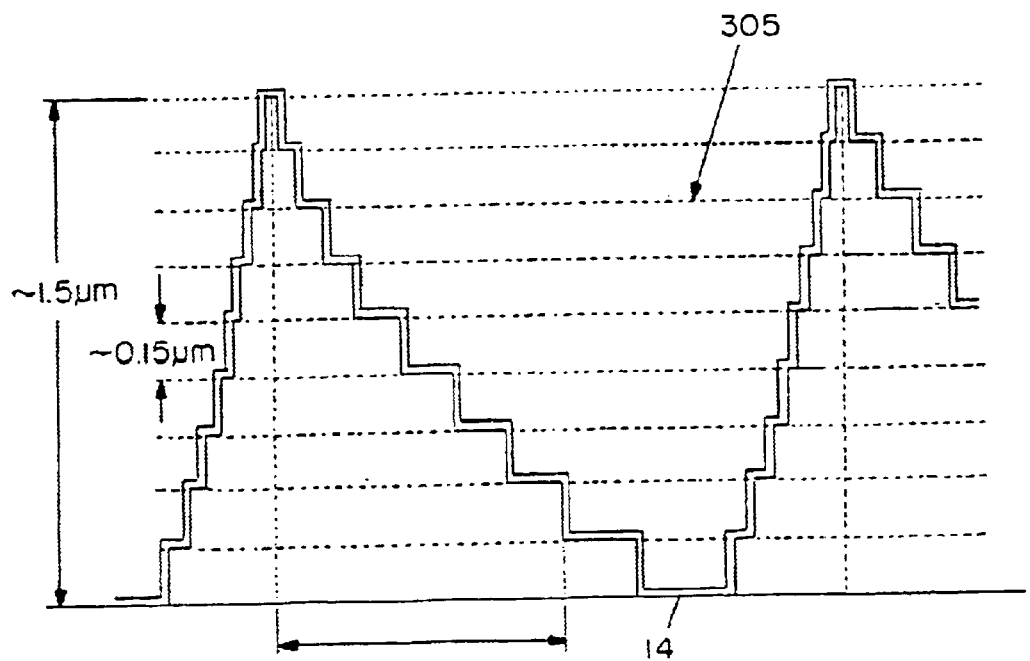
FIG. 8B is a side view of an asymmetrical reflective surface texture according to the principles of the present invention.

Depressions 305 can be asymmetrically shaped as illustrated in FIG. 8A and FIG. 8B, which are a top-view and side-view of an asymmetrical surface texture respectively. These asymmetrically-shaped depressions 305 or cones are advantageous when creating images on electro-optic device 50. Depending on an orientation of the asymmetrical depressions 305 and angle of viewing, certain orders of light can be more easily viewed by observer 45. For example, an observer looking directly down onto a flat substrate 12 views reflected light 70 from many different angles. The asymmetrical surface textures can be used to beneficially produce a more consistent image and reflections of light across the surface of substrate 12 to an observer 45 when they are strategically placed on a viewing screen.

Figure 12:
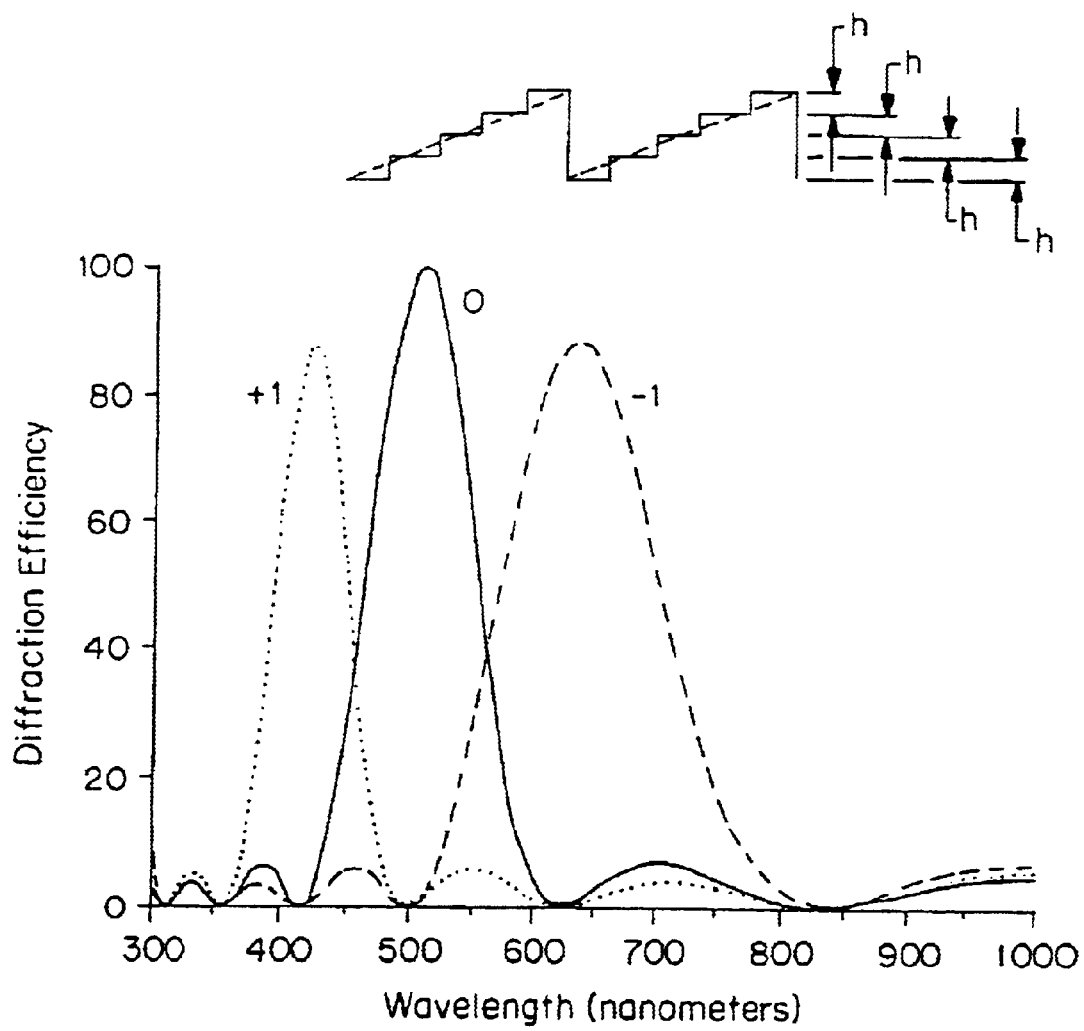
FIG. 12 is a graph illustrating diffraction efficiency versus wavelength for an asymmetrical reflective surface texture according to the principles of the present invention.

Similar to the symmetrical depressions 305 as previously mentioned, the surface area of successive steps 28 for the asymmetrical surface structure are also optionally of equal surface area and step spacing 32. FIG. 12 is a graph illustrating different diffraction efficiencies for different wavelengths of reflected light 70 for asymmetrically-shaped depressions 305. Accordingly, a textured surface can be optimized for viewing different orders of light. Instead of a parabolic shaped stepped depression 305, steps 28 can be formed in a linear fashion so that diffracted light is concentrated in one order and in one direction for an observer 45.

Figure 9:
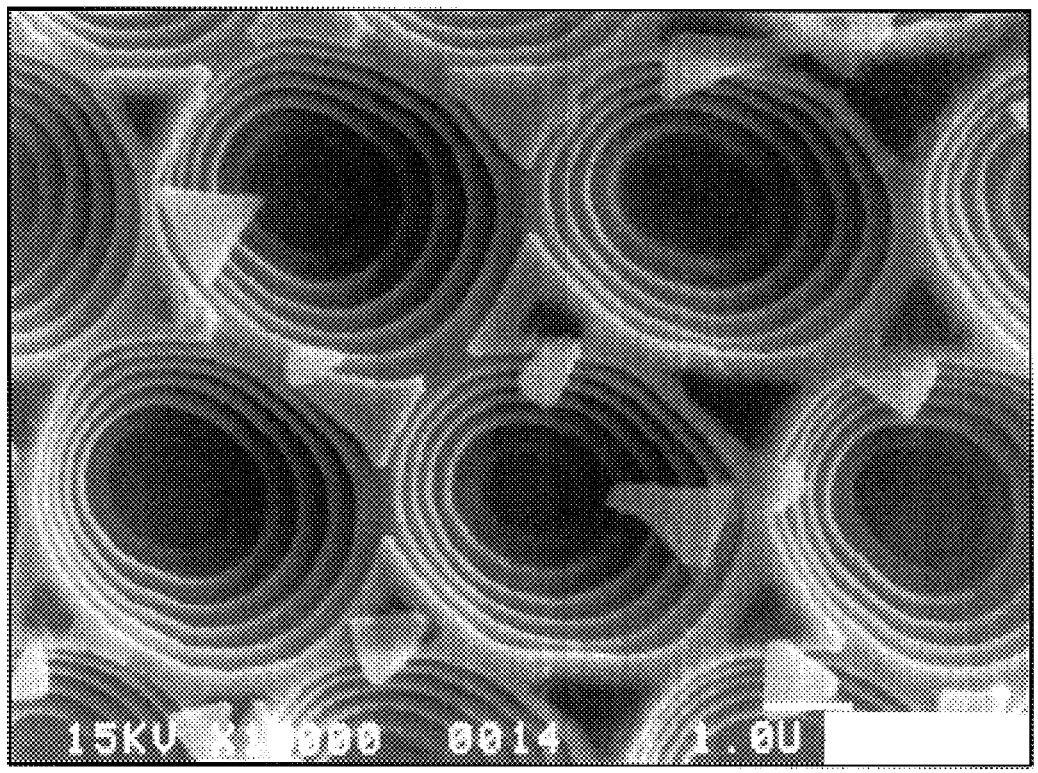
FIG. 9 is a photograph of embossed plastic including asymmetrical reflective surface textures according to the principles of the present invention.

FIG. 9 is a photograph of asymmetrical surface textures according to the principles of the present invention as previously described.

Figure 10:
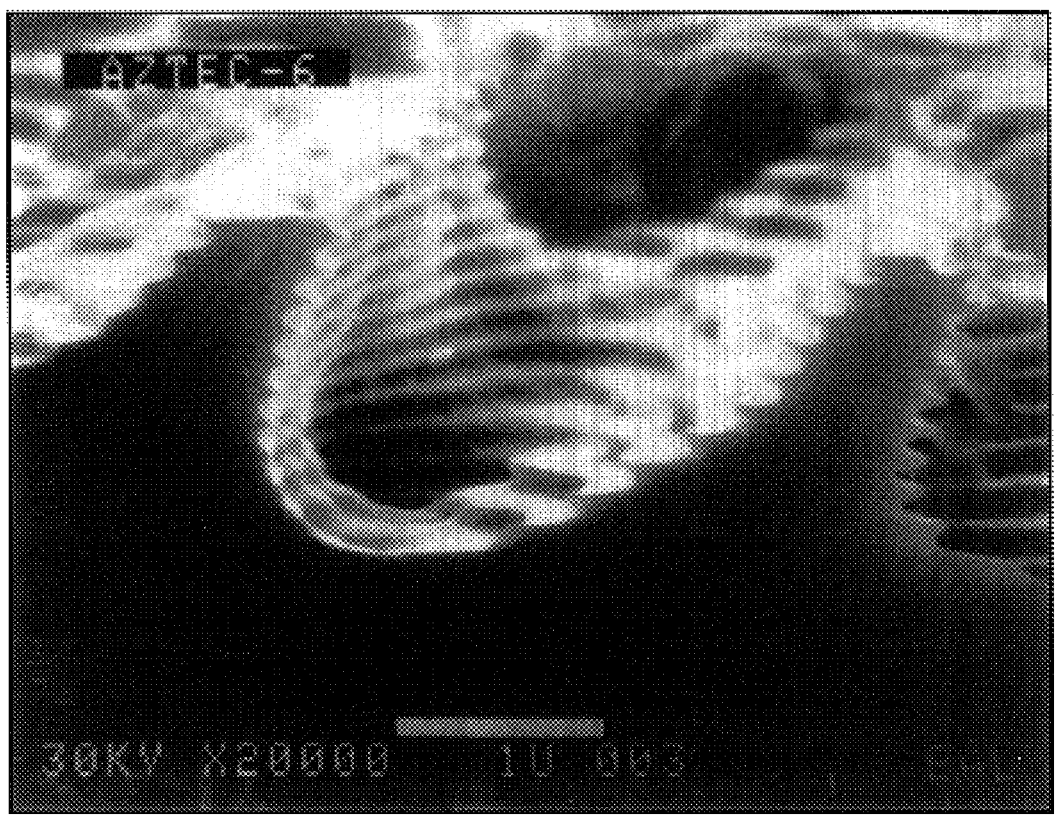
FIG. 10 is a photograph of a complex asymmetrical reflective surface texture according to the principles of the present invention.

FIG. 10 is a photograph of a cross-sectional view of a complex asymmetrical surface texture. Note that steps 28 can be formed as successive grooves in medium 20 rather than ideally shaped steps 28 as previously shown in other figures. It also should be noted that the principles of the present invention can be achieved by providing a coating 14 only on top surfaces of steps 28 rather than the whole surface including sidewalls.

Figure 11:
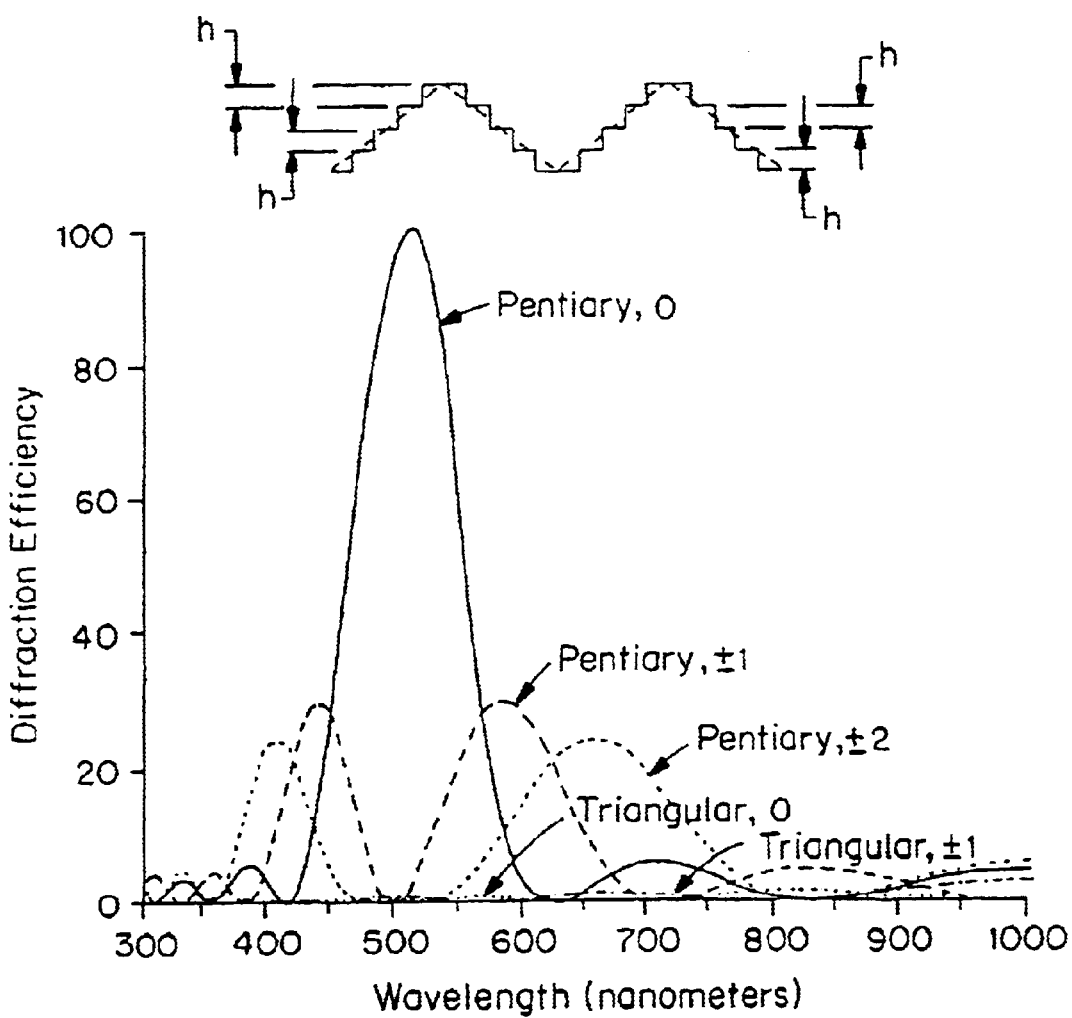
FIG. 11 is a graph illustrating diffraction efficiency versus wavelength for a symmetrical reflective surface texture according to the principles of the present invention.

The calculated diffraction efficiencies of the symmetrical and asymmetrical surface textures are unique as illustrated in FIG. 11 for symmetrically shaped depressions 305 (see FIG. 3) and FIG. 12 for asymmetrically shaped depressions 305 (see FIG. 8B). As shown for the symmetrically shaped surface depressions 305 in FIG. 11, the zero order reflection covers a range of light in the visible spectrum and is predominant over all of the diffracted orders.

As shown in FIG. 12 for the asymmetrical surface textures, on the other hand, the incident visible spectrum is divided into blue, green, and red. These colors correspond respectively to the −1, 0 and +1 orders. Notably, each order generally has a comparable diffraction efficiency. As previously mentioned, these surface textures can be used to optimize reflections off a textured surface.

Figure 13:
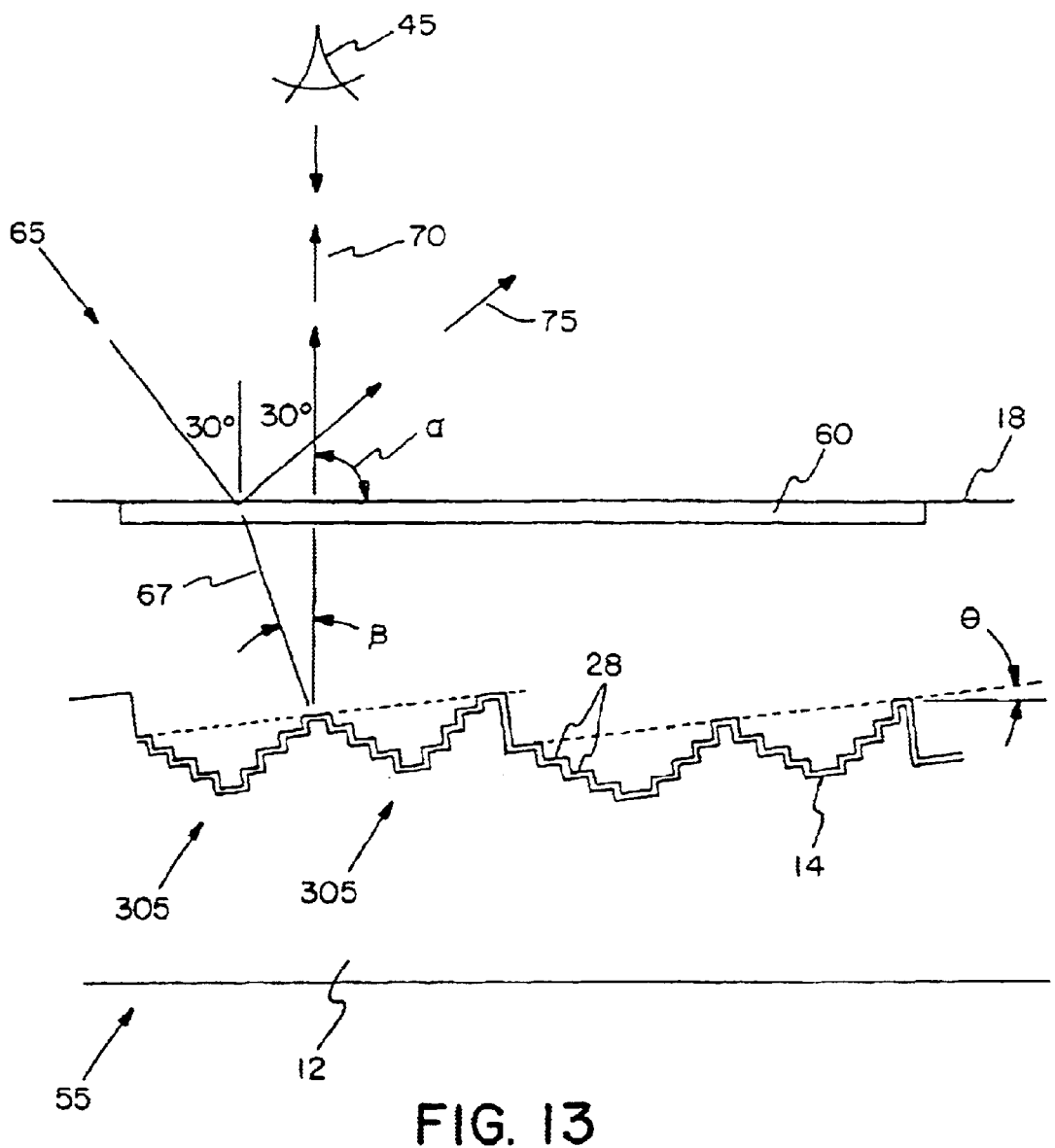
FIG. 13 is a cross-sectional diagram of tilted reflective surface textures according to the principles of the present invention.

FIG. 13 is a side view of tilted reflective surface textures according to the principles of the present invention. In some applications, the glare produced by reflected light off a display prevents observers from viewing an image on the display, thwarting its very purpose. Tilting depressions 305 as shown according to the principles of the present invention is advantageous in display applications where a glare might render it difficult or impossible to view a picture on a display.

Substrate 12 includes depressions 305 or cones that are angled with respect to conductive strip 60 and transparent superstrate 18. For example, the depressions 305 are tilted with respect to a planar axis of the substrate 12. As shown, glare 75 is produced because some incident light 65 provided at a 30 degree angle with respect to a normal axis of superstrate 18 reflects off the surface of transparent superstrate 18. As shown, glare 75 in the present application is reflected away from observer 45.

Note that at least a portion of incident light 65 penetrates superstrate 18 and is refracted towards depressions 305 in substrate 12 at an angle of β. Preferably, the depressions are tilted at an angle θ of β/2 degrees with respect to substrate 12. The incident light 65 is refracted based on Snell's law and is 19.5 degrees when medium 20 is tuned to an index of refraction of 1.5 (n=1.5). Similar to previously discussed aspects of the present invention, internally refracted light 67 reflects off reflective coating 14 of substrate 12 towards observer 45 to produce a colored beam 70 without any glare 75. Thus, it is easier to view an image on the surface of an electro-optic device 55 such as a display. In a preferred embodiment, beam 70 is zero-order diffracted light from grating or steps 28 of corresponding depressions 305.

Figure 14:
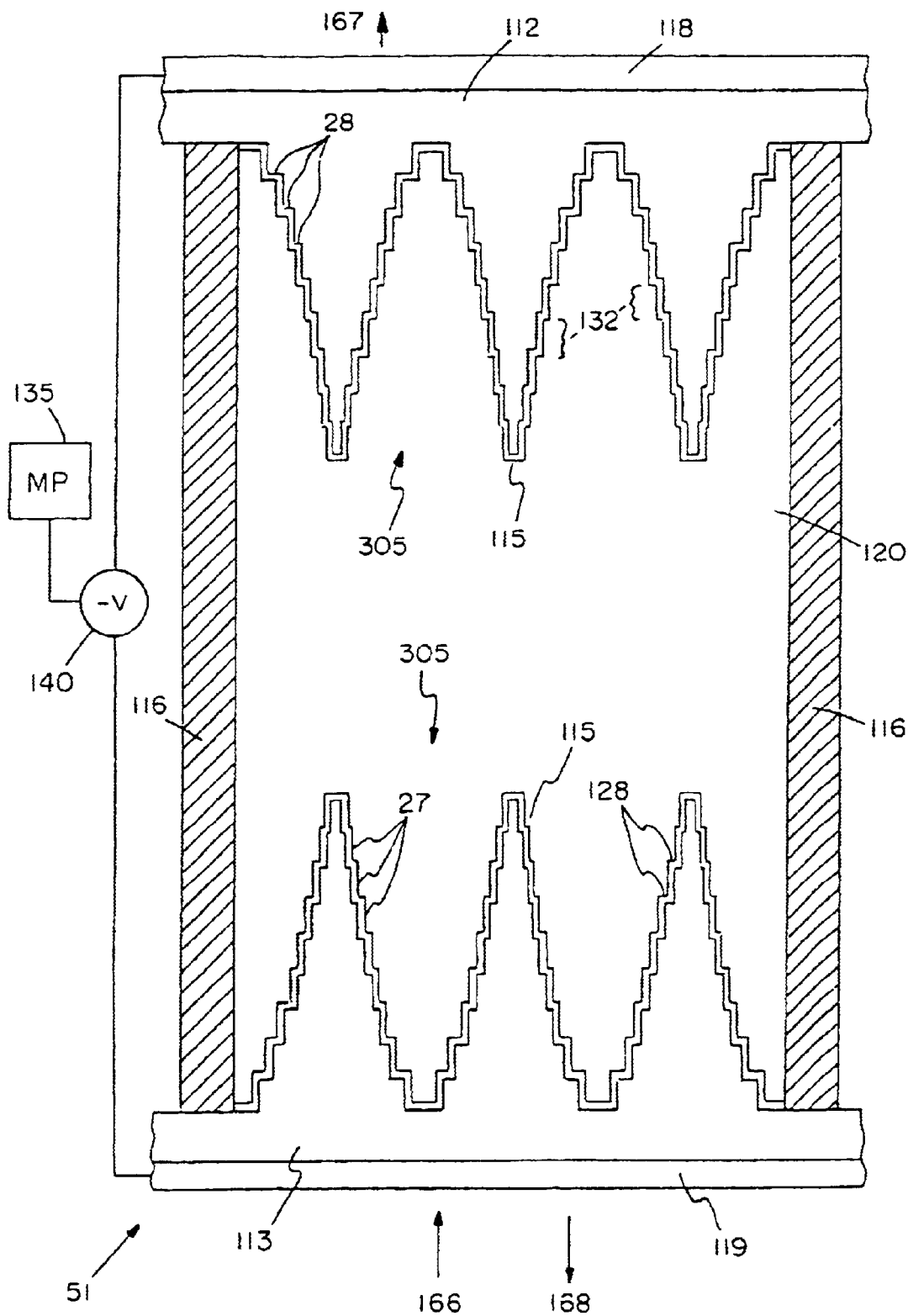
FIG. 14 is a cross-sectional diagram of an electro-optic wavelength tuning device according to the principles of the present invention.

FIG. 14 is a side view diagram of an electro-optical device for tuning wavelengths according to the principles of the present invention. In many respects, the electro-optic device 51 is similar to the electro-optic device 50 as previously described in FIG. 6. For example, cones 305 or depressions of spacing 132, i.e., the distance between each terraced step, as shown in FIG. 14 are formed in a first substrate 113 and second substrate 112 using techniques as previously discussed. However, the first substrate 113 and second substrate 112 such as plastic are preferably transparent. A reflective coating 115 is applied to the exposed surfaces of each substrate.

Reflective coating 115 can be applied by means of vacuum deposition to the surface of substrate 112 such as embossed plastic and is preferably a high-index (n>>2) non-absorbing dielectric material approximately 100 nanometers thick. It should be noted that coating 115 can also be a thin evaporated layer of reflective metal, such as silver having a thickness of approximately 30 nanometers.

Spacers 116 are formed of suitable insulating material such as glass and act to support a separation of the first conductive superstrate 119 and second conductive superstrate 118. The first substrate 113 and second substrate 112 are positioned so that the cones 305 of each substrate face each. Preferably, the substrates are parallel.

Medium 120 between the reflective first substrate 113 and second substrate 112 is a material having a variable index of refraction. Preferably, medium 120 is a liquid crystal material 20, which reacts to an applied voltage 140 across first conductive superstrate 119 and second conductive superstrate 118.

In contrast to the electro-optical device 50, electro-optic device 51 as shown in FIG. 14 does not include pixel regions for creating colored beams of light for an observer 45. Also electro-optic device 51 does not necessarily require liquid crystal alignment layers since alignment of crystals is achieved by the grating structure or steps 128 formed on first substrate 113 and second substrate 112.

According to the principles of the present invention, broadband incident light 166 from, for example, a fiber is incident to first conductive superstrate 119. The incident light 166 penetrates through the first substrate 113 and corresponding coating 115 to medium 120. The wavelengths of incident light 166 that transmits out of device 51 to produce output light 167 are adjusted according to the index of refraction of medium 120. This light is then transmitted to second substrate and corresponding terraced steps 128. A portion of incident light 166, as mentioned, transmits through to the second substrate to produce output light 167 while a portion of incident light 166 striking surface texture of second substrate 112 reflects towards first substrate 113, opposite to the original direction of incident light 166.

Based on a choice of step spacing 132 and a tuned index of refraction of medium 120, certain wavelengths of incident light 166 will be resonantly reflected between the first substrate 113 and second substrate 112 while other wavelengths will pass through as output light 167 as mentioned. The resonantly reflecting light will eventually be transmitted out the facing of first substrate 113 as light output 168. Typically, light output 168 has a narrow bandwidth corresponding to a tuned wavelength of medium 120. As previously described, spacing 132 of steps 128 and the index of refraction of medium 120 dictate which wavelengths will not pass through electro-optic device 51, producing output light 168. Reflective losses of first conductive layer 119 and second conductive layer 118 can be minimized by providing anti-reflective surface textures at corresponding exposed end surfaces of electro-optic device 51.

In a telecommunication application including electro-optic device 51, it is preferred that output light 168 that does not pass completely through electro-optic device 51 is zero order light having a bandwidth less than 10 nanometers. As mentioned previously, more narrow bands are achieved by providing more steps 128. Accordingly, electro-optic device 51 can be used to extract certain wavelengths from, for example, a broadband light source such as light in a fiber optic cable carrying incident light 166.

Device 51 according to the principles of the present invention has advantageous properties because it can selectively tune a wavelength that is to be filtered from an incoming incident light 166. Thus, a single device can be dynamically tuned at different times to extract different wavelengths of incident light 166.

Another advantage of electro-optic device 51 is that the surface textures including depressions 305 or cones can be cheaply and easily replicated. In contrast, the process of manufacturing thin film coatings is tedious and expensive.

Figure 15:
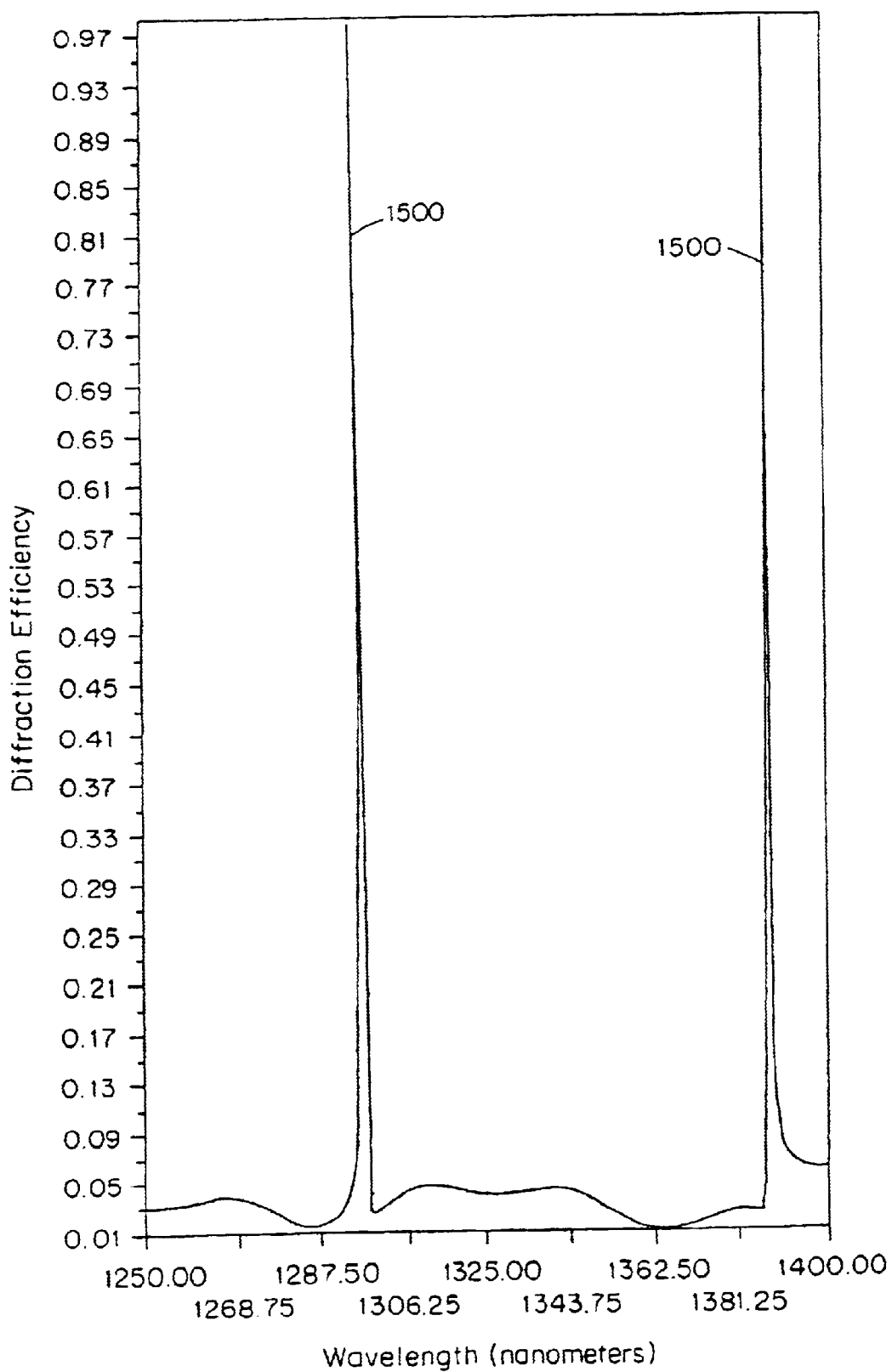
FIG. 15 is a graph of diffraction efficiency versus wavelength of an electro-optic tuning device for a tuned reflected wavelengths in a range of wavelengths between 1250 and 1400 nanometers according to the principles of the present invention.

FIG. 15 is a graph illustrating transmissive-reflective characteristics of electro-optic device 51 described above for a spectral band of incident light between 1250 to 1400 nanometers. As shown, the peaks or spikes 1500 indicate which broadband incident light 166 gets reflected as output light 168 and which light passes through electro-optic device 51 as output light 167. The calculations as shown in the graph are based on a configuration of electro-optic device 51 where the first substrate 113 and second substrate 112 have ten steps 128 per cone 305 or depression at adjacent spacings of 1.0 micrometer, a step spacing 132 of 0.8 micrometers, and a substrate separation that is supported by a length of spacers 116 of twenty micrometers. It should be noted that depressions 305 on the facing of first substrate 113 for this example are offset by one hundred and eighty degrees. That is, the depressions or cones 305 on facing substrates do not necessarily line up with each other. The same results are expected, however, whether the depressions 305 on opposite facings are aligned or not.

Figure 16:
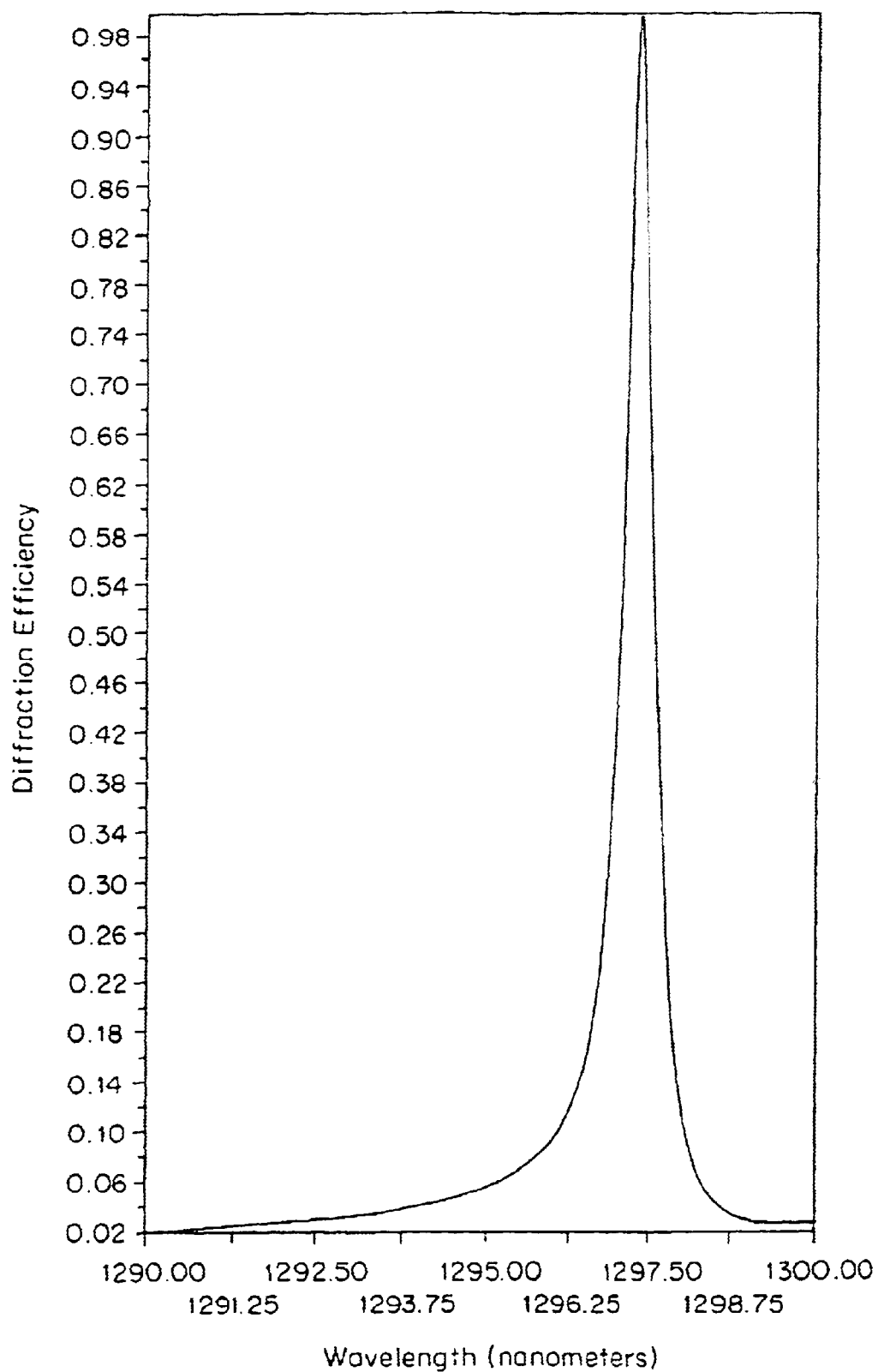
FIG. 16 is another graph of diffraction efficiency versus wavelength of an electro-optic tuning device for a tuned reflected wavelengths in a range of wavelengths between 1290 and 1300 nanometers according to the principles of the present invention.

FIG. 16 is a graph illustrating a magnification of peak 1500 shown in FIG. 15. The graph illustrates that a configuration of electro-optic device 51 can be electrically tuned so that wavelengths in a specific range such as a 0.5 nanometer range are reflected as output light 168 while other wavelengths pass through device 51 as output light 167.

Figure 17:
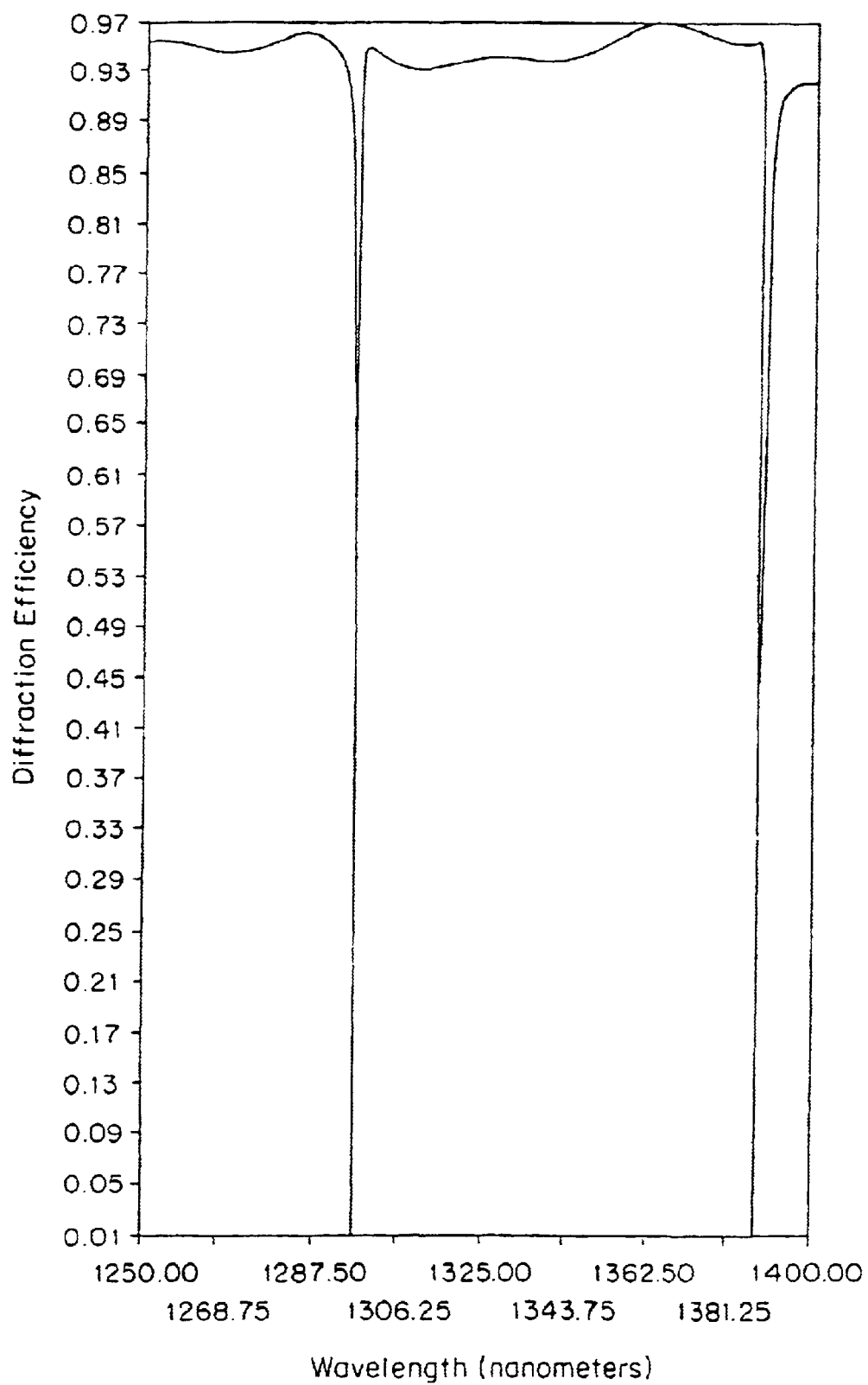
FIG. 17 is a graph of diffraction efficiency versus wavelength of an electro-optic tuning device for a transmitted spectrum of non-tuned wavelengths in a range of wavelengths between 1250 and 1400 nanometers according to the principles of the present invention.

FIG. 17 is a graph illustrating transmissive characteristics of another configuration of electro-optic device 51 as described above for a spectral band of incident light between 1250 to 1400 nanometers. Calculations for this graph are based on a configuration of electro-optical device 51 where first substrate 113 and second substrate 112 are made from a material having an index of refraction of n=1.5, and medium 120 is tuned to have an index of refraction of n=1.0. Electro-optic device 51 is almost 95% transmissive for wavelengths of output light 167 and 1% transmissive for those wavelengths reflected out as output light 168.

Figure 18:
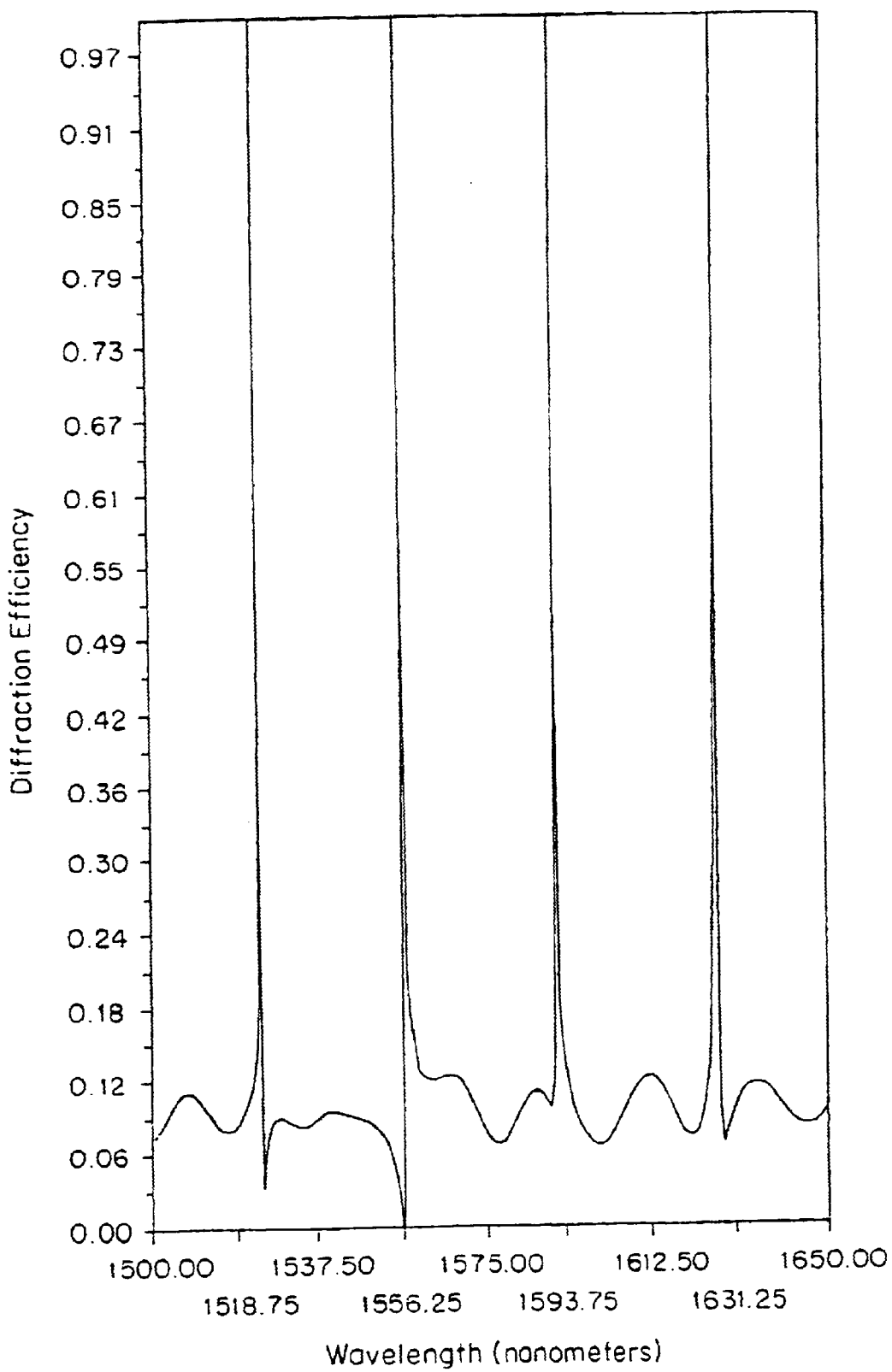
FIG. 18 is a graph of diffraction efficiency versus wavelength of an electro-optic tuning device for a tuned reflected wavelength in a range of wavelengths between 1500 and 1650 nanometers according to the principles of the present invention.

FIG. 18 is a graph illustrating transmissive characteristics of electro-optic device 51 described above for a spectral band of incident light between 1500 to 1650 nanometers. Calculations shown in this graph are based on a configuration of electro-optic device 51 dimensionally similar to the surface texture above for FIG. 15, but the first substrate 113 and second substrate 112 have an index of refraction of n=2.0 and medium 120 is tuned to an index of refraction of n=1.5. This high value for the grating index or textured surfaces of the substrates can be achieved by vacuum coating the replicated grating surface texture of first substrate 113 and second substrate 112 (n=1.5) with a dielectric coating 15 such as AgCl having an index of refraction of n=2.02.

Figure 19:
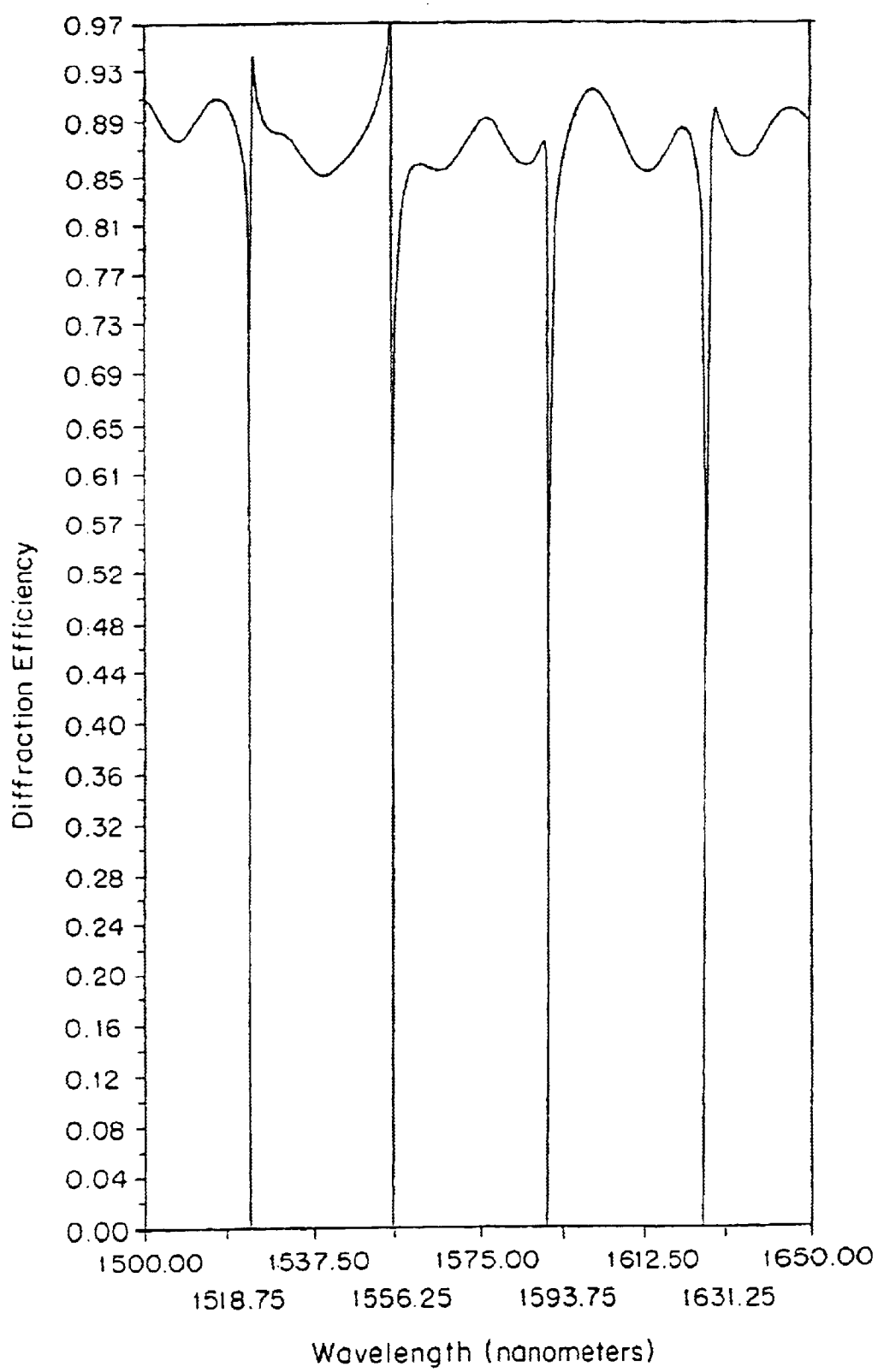
FIG. 19 is another graph of diffraction efficiency versus wavelength of an electro-optic tuning device for a transmitted spectrum of non-tuned wavelengths in a range of wavelengths between 1500 and 1650 nanometers according to the principles of the present invention.

FIG. 19 is a graph illustrating the transmissivity of wavelengths between 1500 and 1650 for incident light 166 through electro-optical device 51. As shown, most wavelengths are transmitted through electro-optic device 51 as output light 167 at an efficiency of greater than 88%. The transmission efficiency through device 51 is lower than that shown in FIG. 17 because reflectivity losses occur at a device 51 interface such as air. Higher transmissivity of wavelengths through electro-optical device 51 can be achieved by affixing an embossed antireflection surface to outer surface of first conductive layer 119 and second conductive layer 118.

Figure 20:
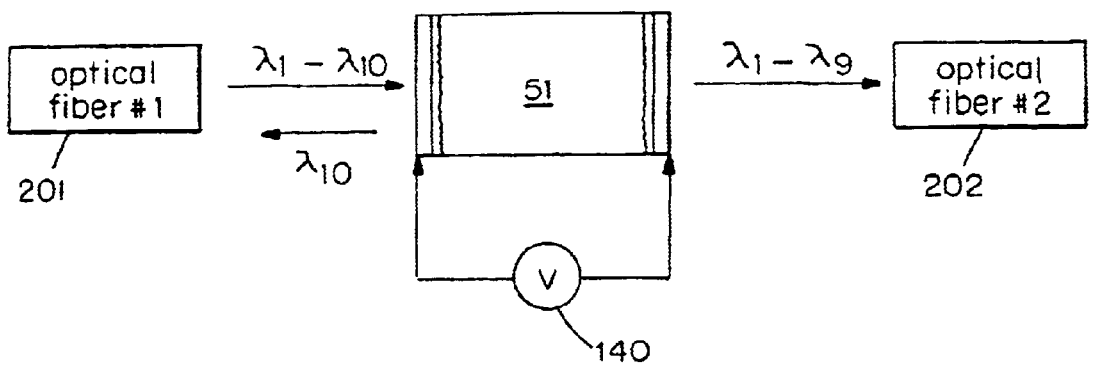
FIG. 20 is a wavelength multiplexor system including an electro-optic device according to the principles of the present invention.

FIG. 20 is a wavelength multiplexor system according to the principles of the present invention. As shown, multiple wavelengths $\lambda_1$ through $\lambda_{10}$ are provided by first optical fiber 201. This incident light is directed through electro-optic device 51, which is tuned to reflect $\lambda_{10}$ back towards first optical fiber 201 and pass wavelengths $\lambda_1$–$\lambda_9$ to couple onto second optical fiber 202. A lengthwise axis of optical device 51 is aligned with the axis of first optical fiber 201 and second optical fiber 202 to support appropriate coupling of wavelengths to each fiber.

Figure 21:
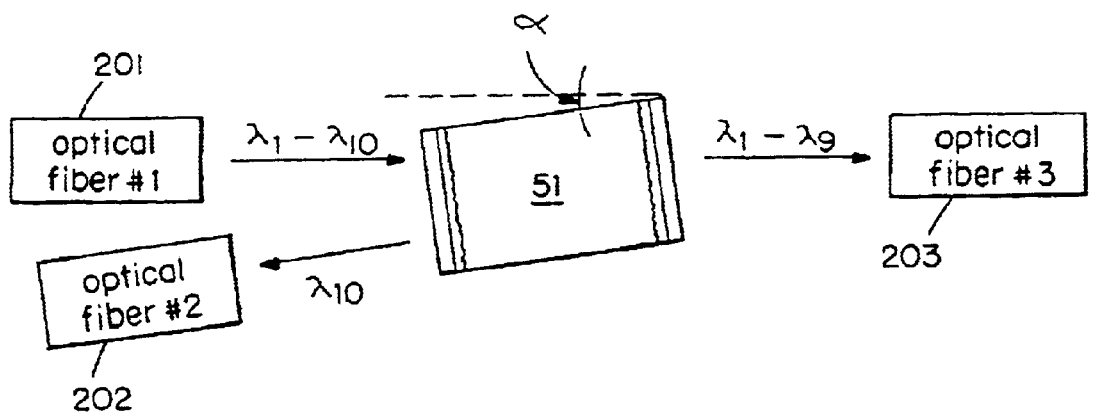
FIG. 21 is a wavelength multiplexor system including an angled electro-optic device for multiplexing wavelengths according to the principles of the present invention.

FIG. 21 is a wavelength multiplexor system for multiplexing wavelengths according to the principles of the present invention. Incident light $\lambda_1$–$\lambda_{10}$ is directed towards electro-optical tuning device 51 that is tilted at an angle $\alpha$ with respect to a lengthwise axis of first optical fiber 201. When electro-optic device 51 is tuned to $\lambda_{10}$ as shown, wavelength $\lambda_{10}$ is reflected back from device 51 into second optical fiber 202 that is disposed to receive this reflected light. Wavelengths $\lambda_1$–$\lambda_9$ pass through electro-optic device and couple onto third optical fiber 203. Accordingly, electro-optic device 51 can be tuned to reflect out certain wavelengths to support wavelength division multiplexing.

Figure 22:
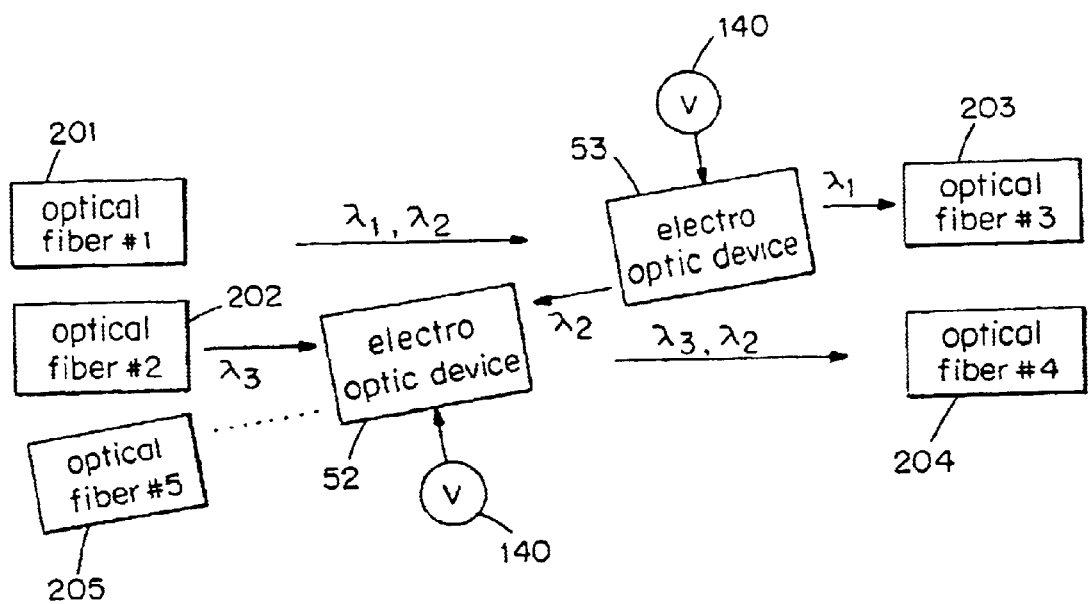
FIG. 22 is a wavelength multiplexor system including multiple angled electro-optic devices for multiplexing wavelengths according to the principles of the present invention.

FIG. 22 is another wavelength multiplexor system for multiplexing wavelengths according to the principles of the present invention. Incident light of wavelengths $\lambda_1$ and $\lambda_2$ is provided by first optical fiber 201. First electro-optic device 53 and second electro-optic device 52 are tuned to reflect back wavelength $\lambda_2$. Thus, wavelength $\lambda_2$ is coupled onto fourth optical fiber 204. If the second electro-optic device 52 were not tuned to reflect back wavelength $\lambda_2$ as previously discussed, wavelength $\lambda_2$ would otherwise pass through and couple onto fifth optical fiber 205. Accordingly, first electro-optical device 53 and second electro-optic device can be tuned to multiplex a tuned wavelength to other fibers. If this system as in FIG. 22 is expanded to include cascaded electro-optic devices, multiple wavelengths from one fiber can be multiplexed to another single fiber or split among multiple fibers.

Figure 23:
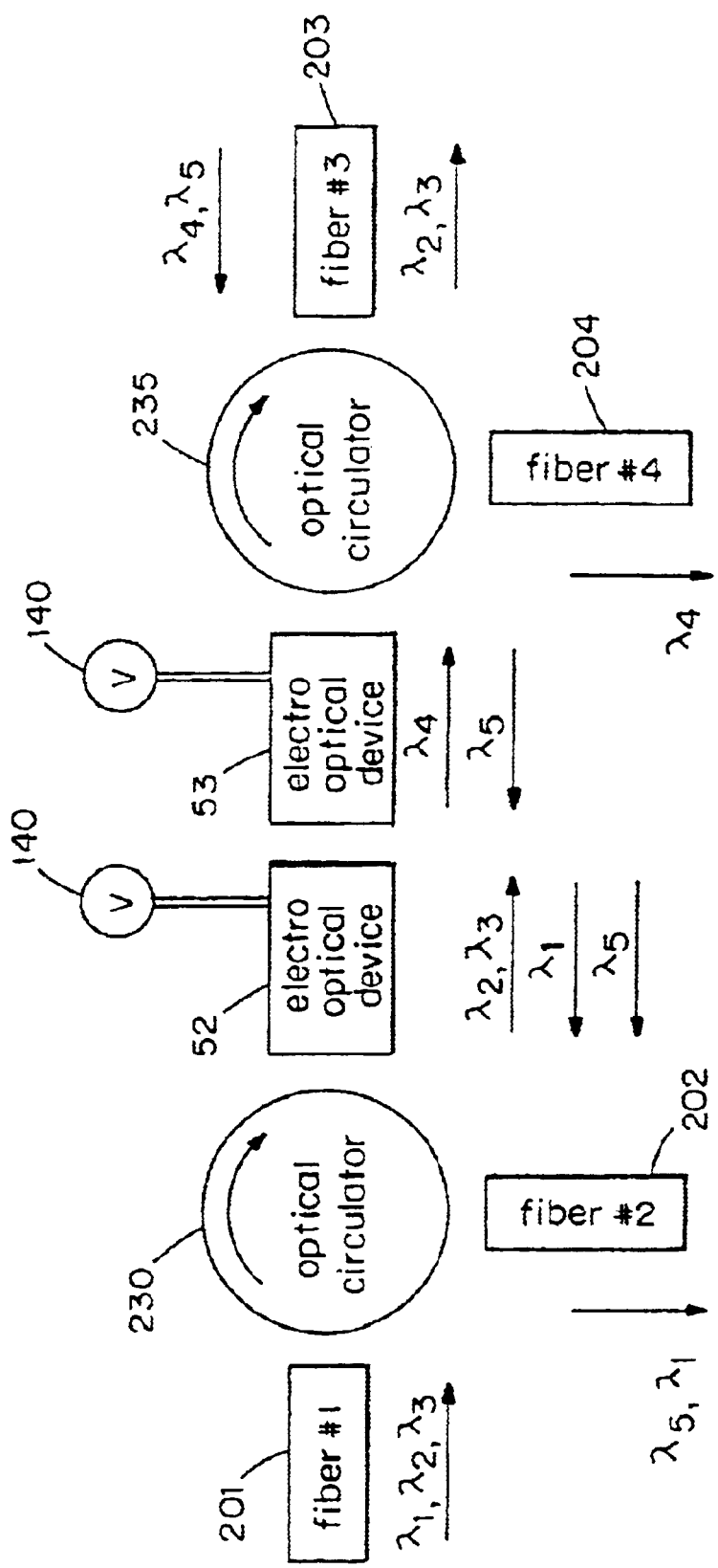
FIG. 23 is a wavelength multiplexor system including multiple electro-optic devices and optical circulators for multiplexing wavelengths according to the principles of the present invention.

FIG. 23 is yet another wavelength multiplexor system for multiplexing wavelengths according to the principles of the present invention. The operation of such a system is similar to the systems as previously described. However, a first optical circulator 230 and a second optical circulator 235 are also tuned to redirect selected wavelengths. For example, first optical circulator 203 allows wavelengths $\lambda_1$–$\lambda_3$ to pass through to second electro-optical device 52, which is tuned to reflect back $\lambda_1$ towards first optical circulator 230 as shown. First optical circulator 230 receives wavelength $\lambda_1$ and is tuned to redirect wavelength $\lambda_1$ out second optical fiber 202.

In a similar manner, first electro-optical device 53 is tuned to reflect back wavelength $\lambda_4$ provided by third optical fiber to second optical circulator 235. Wavelength $\lambda_4$ is then redirected by second optical circulator 235 onto fourth optical fiber 204. Accordingly, the optical circulators and electro-optic devices can be tuned to support redirection of wavelengths onto selected fibers.

It should be noted that optical circulators are optionally replaced with an optical splitter or angled mirror that allows electromagnetic waves to pass in one direction through the mirror but reflects such waves in an opposite direction. Thus, selected waves that are reflected back from an electro-optic device 51 can be redirected to other fibers.

Figure 24:
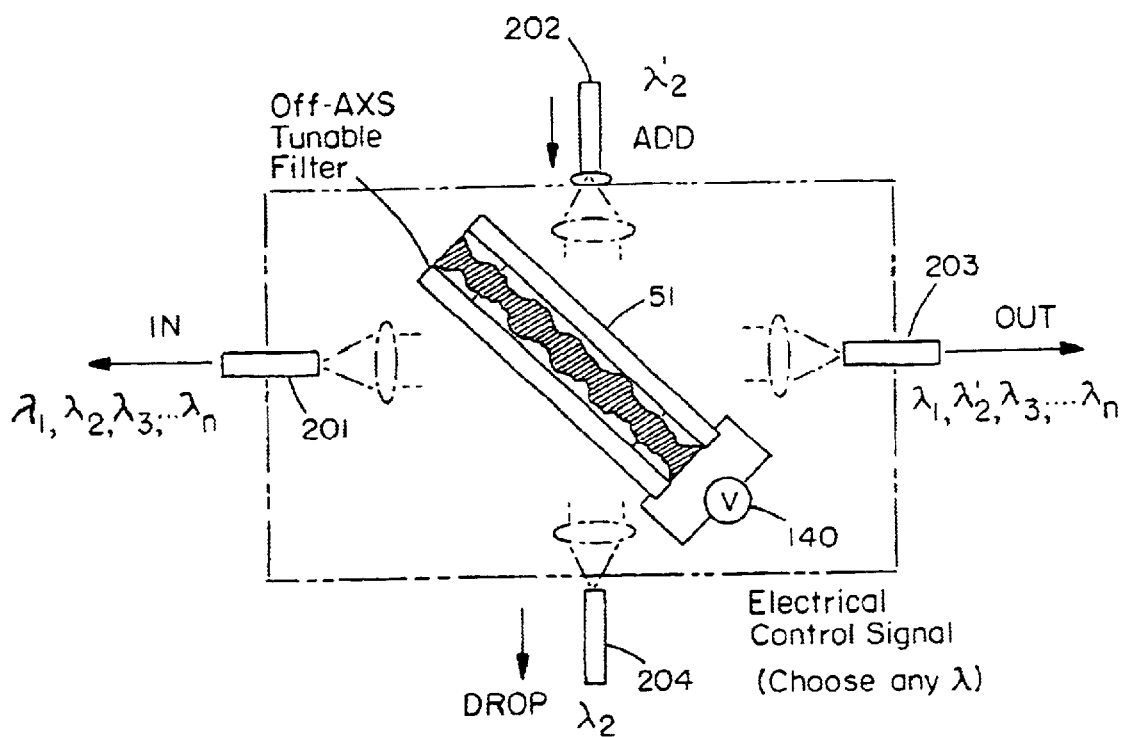
FIG. 24 is a wavelength multiplexor system including an electro-optic device for multiplexing wavelengths according to the principles of the present invention.

FIG. 24 is another system for multiplexing wavelengths according to the principles of the present invention. As shown, a wavelength $\lambda_2$ incident from a first optical fiber 201 can be redirected to fourth optical fiber 204 by tuning electro-optic device 51 to a wavelength of $\lambda_2$. Wavelengths other than $\lambda_2$ such as $\lambda_1$ and $\lambda_3$–$\lambda_n$ are transmitted through electro-optic device 51 onto third optical fiber 203. In a similar manner, a wavelength $\lambda'2$ provided at second optical fiber 202 can be redirected towards third optical fiber 203 so that the wavelength is effectively added to an output fiber. Note that lenses can be used to expand incident light from fibers so that optical energy is more equally distributed along a surface of the electro-optic device 51.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus comprising:
    a first substrate having a surface relief pattern on a face;
    a second substrate having a surface relief pattern on a face, the first and second substrate disposed to form a resonant cavity; and
    a material disposed in the cavity having a selected index of refraction.

2. An apparatus as in claim 1, wherein a combination of the first and second substrates reflects wavelengths of incident light based on the selected index of refraction of the material between the first and second substrate.

3. An apparatus as in claim 1, wherein the index of refraction of the material between the first and second substrates is selected so that particular wavelengths of light incident to the cavity are reflected back in a direction from which they were originally transmitted.

4. An apparatus as in claim 1, wherein at least one of the substrates includes a reflective layer of material on its surface relief pattern.

5. An apparatus as in claim 1, wherein the material of the cavity is selected so that a range of wavelengths do not pass through a combination of the first and second substrate.

6. An apparatus as in claim 1, wherein the first and second substrate are transparent and electromagnetic waves that are not reflected off the terraced steps pass through a combination of the first and second substrates.

7. A method comprising the steps of:
    disposing a first substrate having a surface relief pattern on a face and a second substrate having a surface relief pattern on a face to form a resonant cavity; and
    selecting an index of refraction of a material disposed between the first and second substrate for filtering electromagnetic waves incident on the first substrate.

8. A method as in claim 7 further comprising the steps of:
    reflecting a particular wavelength of light incident to the cavity back in a direction from which it was originally transmitted based on the selected index of refraction of the material between the first and second substrates.

9. A method as in claim 7 further comprising the step of:
    disposing a reflective layer on the a surface relief pattern of at least one substrate.

10. A method as in claim 7, wherein an index of refraction of the material of the cavity is selected so that a range of wavelengths do not pass through a combination of the first and second substrate.

11. A method as in claim 7, wherein electromagnetic waves that are not reflected off the terraced steps pass through both the first and second substrates.

12. A method as in claim 8 further comprising the step of:
    disposing the faces of the substrates having the terraced steps towards each other to form the cavity.

13. An apparatus for tuning electromagnetic waves, the apparatus comprising:
    a first substrate having a first surface relief pattern on a face;
    a second substrate having a second surface relief pattern on a face, the first and second surface relief patterns of the first and second substrate disposed to face each other to form a resonant cavity; and
    a material disposed between the first and second substrate having a variable index of refraction.

14. An apparatus as in claim 13, wherein the first and second substrate reflect a band of wavelengths based on a tuned index of refraction of the material.

15. An apparatus as in claim 13, wherein the index of refraction of the material is controlled by an applied electric field.

16. An apparatus as in claim 13, wherein the material is a liquid crystal.

17. An apparatus as in claim 13, wherein the applied electric field is controlled so that a selected wavelength does not pass through the first and second substrate.

18. An apparatus as described in claim 13, wherein wavelengths of incident electromagnetic waves are adjusted based on an index of refraction of the material and reflected wavelengths of light corresponding to a step spacing of the surface relief patterns add coherently.

19. An apparatus as described in claim 13, wherein electromagnetic waves that are not reflected off the surface relief patterns pass through the first and second substrate.

20. An apparatus as described in claim 13 for multiplexing wavelengths, wherein the index of refraction of the material is tuned to redirect certain bandwidths of incident electromagnetic waves to an optical fiber.

21. A method for tuning electromagnetic waves comprising:
    providing a first substrate having a first surface relief pattern on a face and a second substrate having a second surface relief pattern on a face, the surface relief patterns of the first and second substrate disposed adjacent each other to form a resonant cavity; and
    adjusting an index of refraction of a material disposed between the first and second substrate.

22. A method as in claim 21 further comprising the step of:
reflecting a band of wavelengths based on an index of refraction of the material between the first and second substrate.

23. A method as in claim 21, wherein the index of refraction of the material is controlled by an applied electric field.

24. A method as in claim 21, wherein the material is a liquid crystal.

25. A method as in claim 23, wherein the applied electric field is adjusted so that a selected wavelength does not pass through the first and second substrate.

26. An apparatus as described in claim 21, wherein wavelengths of incident electromagnetic waves are adjusted based on an index of refraction of the material and reflected wavelengths of light corresponding to a step spacing of terraced steps disposed on the first and second surface relief patterns add coherently.

27. An apparatus as described in claim 26, wherein electromagnetic waves that are not reflected off the terraced steps pass through the first and second substrate.

28. An apparatus as described in claim 21 for multiplexing wavelengths, wherein the index of refraction of the material is tuned to redirect certain bandwidths of incident electromagnetic waves to an optical fiber.

29. An apparatus for tuning electromagnetic waves, the apparatus comprising:
a first transparent substrate having a surface relief pattern on a face;
a second transparent substrate having a surface relief pattern on a face, the surface relief patterns of the first and second substrate disposed to face each other forming a resonant cavity; and
a liquid crystal material disposed between the first and second substrate having a variable index of refraction, an index of refraction of the liquid crystal material being controlled by an applied electric field for selecting which wavelengths of incident light are transmitted through the first and second substrate.

30. An apparatus comprising:
a substrate having terraced steps on its face; and
a non-absorbing dielectric coating of a substantially uniform thickness, having an index of refraction, adhered to the terraced steps of the substrate, a combination of the coating and terraced steps on the substrate supporting coherent reflections of an electromagnetic wavelength.

31. An apparatus as in claim 30, wherein the dielectric coating has an index of refraction greater than 2.

32. An apparatus as in claim 30, wherein the dielectric coating is applied via vacuum deposition.

33. An apparatus as in claim 30, wherein the dielectric coating is a thin evaporated layer of material.

34. An apparatus as in claim 30, wherein a thickness of the dielectric coating on the terraced steps is on an order of nanometers.

35. An apparatus as in claim 30, wherein at least a portion of electromagnetic waves incident to the combination of the coating and terraced steps on the substrate penetrate through the dielectric coating and are reflected off a surface of the terraced steps.

36. A method comprising the steps of:
providing a substrate having terraced steps on its face; and
depositing a non-absorbing dielectric coating having an index of refraction to the terraced steps of the substrate, the coating being of a substantially uniform thickness, a combination of the coating and terraced steps on the substrate supporting constructive reflections of an electromagnetic wavelength.

37. A method as in claim 36, wherein the dielectric coating has an index of refraction greater than 2.

38. A method as in claim 36, wherein the dielectric coating is applied via vacuum deposition.

39. A method as in claim 36, wherein the dielectric coating is a thin evaporated layer of material.

40. A method as in claim 36, wherein a thickness of the dielectric coating on the terraced steps is on an order of nanometers.

41. A method as in claim 36, wherein at least a portion of electromagnetic waves incident to the combination of the coating and terraced steps on the substrate penetrate through the dielectric coating and are reflected off a surface of the terraced steps.

42. An apparatus comprising:
a substrate having terraced steps on its face;
a non-absorbing dielectric coating, having an index of refraction, adhered to the terraced steps of the substrate so that a combination of the coating and terraced steps on the substrate result in a reflection of a particular electromagnetic wavelength, the dielectric coating having an index of refraction greater than 2.

43. A method comprising:
providing a substrate having terraced steps on its face;
depositing a non-absorbing dielectric coating having an index of refraction to the terraced steps of the substrate so that a combination of the coating and terraced steps on the substrate result in a reflection of a particular electromagnetic wavelength, the dielectric coating having an index of refraction greater than 2.

* * * * *